United States Patent Office 3,529,982
Patented Sept. 22, 1970

3,529,982
PROCESS FOR PROTECTING ORGANIC MATERIAL FROM THE ACTION OF ULTRAVIOLET RAYS
Christian Luethi, Munchenstein, Max Duennenberger, Frankendorf, and Hans Rudolf Biland, Basel, Switzerland, assignors to Ciba Limited, Basel, Switzerland, a company of Switzerland
No Drawing. Filed Feb. 6, 1967, Ser. No. 614,039
Claims priority, application Switzerland, Feb. 7, 1966, 1,679/66, 1,680/66
Int. Cl. C08f 45/60; C08g 51/60; B44d 1/00
U.S. Cl. 106—178
4 Claims

ABSTRACT OF THE DISCLOSURE

This invention refers to a process for protecting organic materials that can be damaged by ultraviolet rays, from the action of ultraviolet rays, wherein asymmetrical oxalic acid diarylamides of the general formula

A—NH—CO—CO—NH—B where A and B are different from each other and each represents a benzene or naphthalene residue, these residues A and B (a) being free from hydroxyl groups in the ortho-positions to the amide nitrogen atom and (b) containing if desired substituents that contain no more than 20 carbon atoms and do not displace the absorption maximum of the compound towards values above 400 mμ, are applied to said materials, as well as compositions containing said oxalic acid diarylamides.

---

The present invention provides asymmetrical oxalic acid diarylamides and processes for their manufacture and use as light filters, especially ultraviolet absorbers, for organic materials that are damaged by the action of ultraviolet rays.

It has already been described that oxalic acid bis-hydroxyl arylamides are suitable for use as ultraviolet absorbers, but in the past it had been held that the light stability of such compounds depends on the presence of two free hydroxyl groups in ortho-position relatively to the amide nitrogen atom. In contradistinction to this assumption it has now been found that a large class of oxalic acid diarylamides that do not satisfy the requirement referred to are not only excellent ultraviolet absorbers suitable for industrial use but surprisingly even display a greater stability to light.

Accordingly, the present invention provides a process for protecting organic material that can be damaged by the action of light—preferably non-textile organic materials—from the action of light and especially ultraviolet rays, characterized in that asymmetrical oxalic acid diarylamides of the formula (1)   A—NH—CO—CO—NH—B are used, in which Formula A and B are different from each other and each represents a benzene or naphthalene residue, these residues A and B (a) being free from hydroxyl groups in the ortho-positions relatively to the amide nitrogen atom and
(b) possibly containing further substituents that contain at most 20 carbon atoms and do not displace the absorption maximum of the compound towards values above 400 mμ;

these arylamides are homogeneously distributed in the organic material to be protected or applied to the surface of said material or the material to be protected is coated with a filter layer that contains the compounds described. These new compounds are particularly valuable for protecting polycondensates, polyadducts and polyvinylchloride from the action of ultraviolet rays.

Depending on the practical importance for certain types of substrates, on the chemical relationship on the other hand or finally on the novelty of the substances these compounds may be classified according to different standpoints or subdivided into subgroups.

A group that is important from the standpoint of application comprises asymmetrical compounds of the general formula (2) 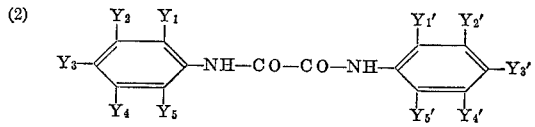

in which $Y_1$ and $Y_5$ as well as $Y'_1$ and $Y'_5$ each stands for a hydrogen or halogen atom, or a substituent with up to 20 carbon atoms from the series alkyl, substituted alkyl, benzene radical, benzyl group, a group —CO—NHE$_1$ or —SO$_2$—NH—E$_1$ (where E$_1$ is hydrogen, alkyl or aryl), a group —COOE$_2$ or —SO$_3$E$_2$ (where E$_2$ is hydrogen, alkyl, aryl or a salt-forming cation), a nitro group, a primary, secondary or tertiary amino group or an acylamino group, and $Y_2$, $Y_3$ and $Y_4$ as well as $Y'_2$, $Y'_3$ and $Y'_4$ each represents the same kind of group as $Y_1$ and $Y_5$ or $Y'_1$ and $Y'_5$ or a hydroxyl group, and (a) each benzene nucleus contains at most two substituents —CO—NH—E$_1$, —SO$_2$—NH—E$_1$, —COOE$_2$, —SO$_3$E$_2$ or hydroxyl,
(b) each benzene nucleus contains at most three of the other substituents different from hydrogen, and
(c) the substituents in the two benzene nuclei differ from each other in at least one point as to type, number or positions.

Within the scope of the above definition halogen is, for example, chlorine or bromine; an alkyl is either one having a low number of carbon atoms (C$_1$ to C$_4$) and being branched or linear, or a higher alkyl group with 5 to 18 carbon atoms (for example octyl, dodecyl and the like). A substituted alkyl group is chloralkyl, bromalkyl, hydroxyalkyl, alkoxyalkyl, carboxyalkyl or carbalkoxyalkyl. Acylamino groups are acetylamino or benzoylamino, and amino groups are above all methylamino and ethylamino and anilino groups.

Of value within the scope of Formula 1 are also those asymmetrical compounds which correspond to the formula (3) 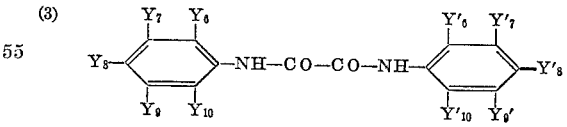

in which $Y_6$ and $Y_{10}$, and $Y'_6$ and $Y'_{10}$, are identical or different and each represents a hydrogen or halogen atom, an alkyl group with 1 to 12 carbon atoms or a phenyl group, and $Y_7$ to $Y_9$, as well as $Y'_7$ to $Y'_9$, represents the same groups as $Y_6$ and $Y_{10}$, or $Y'_6$ and $Y'_{10}$ respectively, or represent a hydroxyl group and (a) each benzene nucleus contains at most two hydroxyl groups,
(b) each benzene nucleus contains at most three of the other substituents different from hydrogen, and
(c) the substituents in the two benzene nuclei differ in at least one point as to kind, number or positions.

According to one variant there are used compounds of the formula (4) 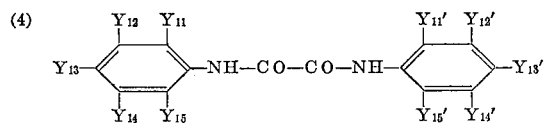

in which $Y_{11}$ to $Y_{15}$ and $Y'_{11}$ to $Y'_{15}$, are identical or different and each represents a hydrogen atom, a group —CO—NH—$E_1$ or —$SO_2$—NH—$E_1$ (where $E_1$ is hydrogen, alkyl with 1 to 4 carbon atoms or phenyl), a group —COO$E_2$ or $SO_3E_2$ (where $E_2$ is hydrogen, alkyl with 1 to 4 carbon atoms, phenyl, an alkali salt ion, ammonium salt ion or amine salt ion) and each benzene nucleus contains at most 1 or 2 of the indicated substituents different from hydrogen, and also in this case the substituents in the two benzene nuclei differing from each other in at least one point as to type, number or positions.

Of special practical value within the scope of the Formula 1 are those compounds which correspond to the following group formulae:

(a) Compounds of the formula (5) 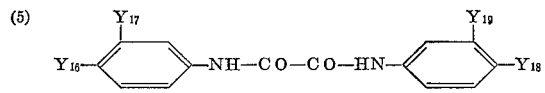

where $Y_{16}$ is a hydrogen or halogen atom or an alkyl group with 1 to 4 carbon atoms; $Y_{17}$ represents hydrogen or an alkyl group with 1 to 4 carbon atoms; $Y_{18}$ stands for hydrogen, halogen, an alkyl group with 1 to 18 carbon atoms which may be substituted by hydroxyl groups, halogen atoms or carboxyl groups, for a nitro group, an amino group, an acylamino group or a carboxylic acid group or its functional derivatives (carboxylic acid amide, carboxylic acid ester, carboxylic acid halide), and $Y_{19}$ represents a hydrogen or halogen atom, and where at least one substituent Y is different from hydrogen.

(b) Compounds of the formula (6) 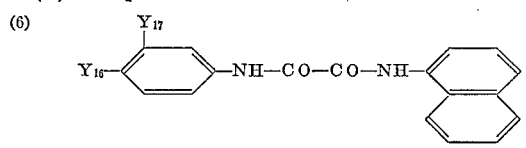

where $Y_{16}$ stands for a hydrogen or halogen atom or an alkyl group with 1 to 4 carbon atoms, and $Y_{17}$ for hydrogen or an alkyl group with 1 to 4 carbon atoms.

(c) Compounds of the formula (7) 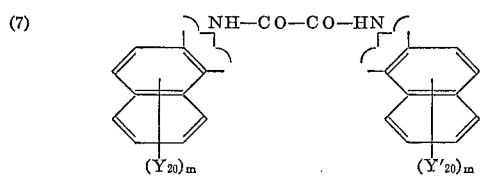

in which the brackets indicate that both α-naphthylamine and β-naphthylamine derivatives are possible. Compounds of this Formula 7 must likewise be free from hydroxyl groups in ortho-position relatively to the amide nitrogen atom; in this formula $Y_{20}$ and $Y'_{20}$ respectively stands for a hydrogen atom, a lower alkyl group with 1 to 4 carbon atoms, a sulphonic acid group or a possibly etherified hydroxyl group ($C_1$ to $C_6$ ethers), and, in the case of the sulphonic acid group, $m=1$ or 2, and otherwise $m=1$. In this formula, too, it suffices for the substituents in the two aromatic rings to differ from each other in one point as to type, number or positions.

(d) Compounds of the formula (8) 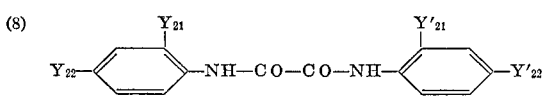

in which $Y_{21}$ and $Y_{22}$, and $Y'_{21}$ and $Y'_{22}$ respectively, are identical or different substituents from the series chlorine, bromine, alkyl with 1 to 4 carbon atoms, a nitro group, or one of the two substituents $Y_{21}$, $Y_{22}$ or $Y'_{21}$, $Y'_{22}$, stands for a hydrogen atom, a carboxylic acid group, a carboxylic acid alkyl ester group with 1 to 8 carbon atoms in the alkyl residue, a sulphonic acid group or a sulphonic acid amide group, or $Y_{22}$ or $Y'_{22}$ represents a hydroxyl group.

(e) Compounds of the formula (9) 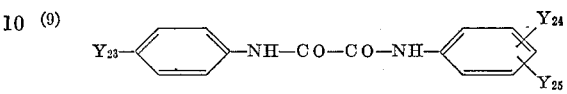

in which $Y_{23}$ represents hydrogen, an alkyl group with 1 to 4 carbon atoms or a fluorine, chlorine, or bromine atom, and $Y_{24}$ and $Y_{25}$ each stand for an alkyl group with 1 to 4 carbon atoms, a chloralkyl or fluoralkyl group or a fluorine, chlorine or bromine atom.

(f) Compounds of the formula

(10) 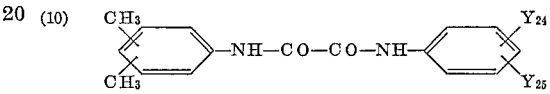

in which $Y_{24}$ and $Y_{25}$ have the above meanings and the methyl groups are preferably in positions 3 and 4.

(g) Compounds of the formula

(11) 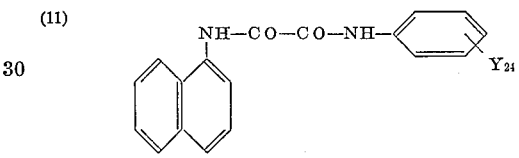

where $Y_{24}$ has the above meaning.

(h) Compounds of the formula

12) 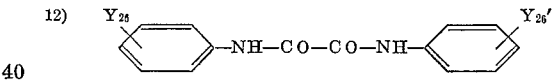

where $Y_{26}$ and $Y'_{26}$ differ from each other as to position and/or meaning and each represents a hydrogen or chlorine atom or a methyl group.

In addition to the main group of compounds defined by the above Formula 2 there should be specially mentioned as the second important main group of compounds the new asymmetrical oxalic acid diarylamides of the formula

(13) 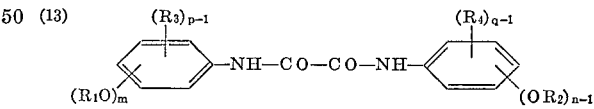

in which $R_1$ and $R_2$ each represents an alkyl group with 1 to 18 carbon atoms which may be substituted by chlorine, hydroxyl groups, alkoxy groups with 1 to 4 carbon atoms, carboxyl groups, nitrile groups, carboxylic acid amide groups or carboxylic acid alkyl ester groups with 1 to 12 carbon atoms; an alkenyl group containing 3 or 4 carbon atoms; a benzyl group which may be substituted by chlorine or alkyl; an aliphatic acyl group with up to 18 carbon atoms a benzoyl group which may be substituted by chlorine or an alkyl group with 1 to 4 carbon atoms; $R_3$ and $R_4$ each represents an alkyl group with 1 to 12 carbon atoms, a halogen atom, a halogenalkyl group, a sulphonic acid group, a phenyl group or a phenylalkyl group whose alkyl residue contains 1 to 4 carbon atoms, or two ortho-positioned residues $R_3$ and/or $R_4$ together form a fused-on six-membered aromatic carbon ring, and where $m$ and $n=1$ or 2 and $p$ and $q=1$, 2 or 3, each of the two ring systems containing in addition to the bond via the —NH— group at most 3 substituents and the sum $m+(n-1)$ being 1 or 2, and in other respects the substituents $R_1O$—, $R_2O$—, $R_3$ and $R_4$ being of a type, number and in positions such that the molecule is asymmetrical. In this formula and in the following formulae the index symbols m, n, p and q (and r, s, t and u respectively) are to be interpreted so that, if the symbol stands for 0, a hydrogen atom in each case takes the place of the indicated residue. The term "aliphatic acyl group containing up to 18 carbon atoms" refers both to saturated and unsaturated acyl groups, thus, for example, the acryl group.

Of great value within the scope of the above formula are the compounds of the formula

(14) 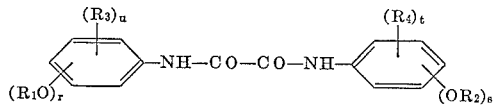

in which $R_1$ and $R_2$ each represents an alkyl group with 1 to 18 carbon atoms which may be substituted by chlorine, hydroxyl groups, alkoxy groups with 1 to 4 carbon atoms, carboxyl groups, carboxylic acid amide groups or carboxylic acid alkyl ester groups with 1 to 12 carbon atoms; an alkenyl group with 3 to 4 carbon atoms; a benzyl group which may be substituted by chlorine and methyl groups; an aliphatic acyl group containing up to 18 carbon atoms; a benzoyl group which may be substituted by chlorine or an alkyl group with 1 to 4 carbon atoms; $R_3$ and $R_4$ each represents an alkyl group with 1 to 12 carbon atoms, a halogen atom, a halogenalkyl group, a sulphonic acid group, a phenyl group or a phenylalkyl group whose alkyl residue contains 1 to 4 carbon atoms or two ortho-positioned residues $R_3$ and/or $R_4$ together form a fused-on six-membered aromatic carbon ring and r, s, t and u each $=0$ or 1, and the sum $(r+s)=1$ or 2.

Of special value are new asymmetrical oxalic acid diarylamides of the formula

(15) 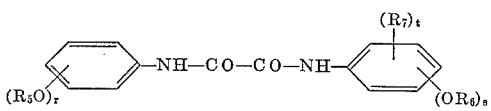

in which $R_5$ and $R_6$ each represents an alkyl group with 1 to 18 carbon atoms which may be substituted by chlorine atoms, hydroxyl groups or alkoxy groups with 1 to 4 carbon atoms, an alkyl group, a benzyl group which may be substituted by chlorine or methyl groups, a carbomethoxy- or carbethoxy-alkyl group with 1 to 6 carbons in the alkyl grouping, an aliphatic acyl group with 1 to 12 carbon atoms, or a benzoyl group which may be substituted by chlorine or an alkyl group with 1 to 4 carbon atoms; $R_7$ represents an alkyl group with 1 to 18 carbon atoms, chlorine or a phenyl group, and r, s and $t=0$ or 1 and the sum $(r+s)=1$ or 2, and in other respects the substituents $R_5O—$, $R_6O—$ and $R_7$ differ from each other as to type, number and positions so that the molecule is asymmetrical.

As further types of compounds of outstanding practical value there may be mentioned the following:

(a) Compounds of the formula

(16) 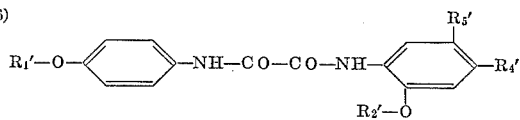

in which $R'_1$ represents an alkyl group with 1 to 4 carbon atoms, $R'_2$ an alkyl group with 1 to 18 carbon atoms, an alkyl group with 1 to 8 carbon atoms which may be substituted by halogen, an alkoxy group with 1 to 4 carbon atoms, a nitrile, carboxyl, carboxylic acid amide or carboxylic acid ester group containing 1 to 18 carbon atoms, an allyl group, a benzyl group, an aliphatic acyl group with 1 to 12 carbon atoms or a benzoyl radical; $R'_4$ represents hydrogen, an alkyl group with 1 to 6 carbon atoms, an alkoxy group with 1 to 4 carbon atoms, a phenyl group or halogen; and $R'_5$ represents hydrogen, a phenyl group, and alkyl group with 1 to 12 carbon atoms or a phenylalkyl group.

(b) compounds of the formula

(17) 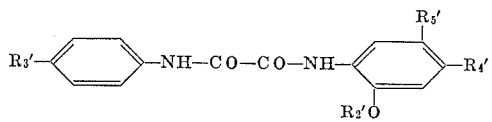

in which $R'_3$ stands for hydrogen, halogen or an alkyl group with 1 to 4 carbon atoms, and $R'_2$, $R'_4$ and $R'_5$ have the same meanings as in Formula 16.

(c) Compounds of the formula

(18) 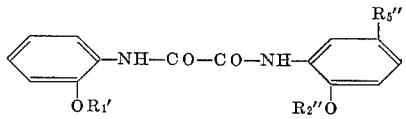

in which $R''_1$ represents an alkyl group with 1 to 4 carbon atoms, $R''_2$ an alkyl group with 1 to 8 carbon atoms, an alkyl group with 1 to 4 carbon atoms which contains halogen atoms or carbalkoxy groups, a benzyl group or an aliphatic acyl group with 1 to 6 carbon atoms; and $R''_5$ stands for hydrogen, halogen or an alkyl group with 1 to 4 carbon atoms.

(d) Compounds of the formula

(19) 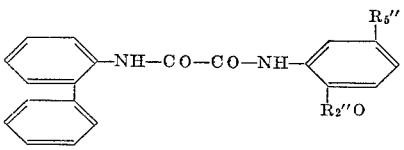

where $R''_2$ and $R''_5$ have the same meanings as in Formula 18.

(e) Compounds of the formula

(20) 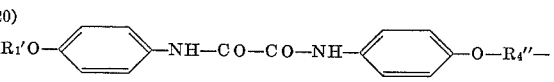

where $R'_1$ stands for an alkyl radical with 1 to 4 carbon atoms and $R''_4$ for an alkyl group with 1 to 12 carbon atoms, an alkenyl group with up to 4 carbon atoms, a benzyl group or an aliphatic or aromatic acyl group with up to 12 carbon atoms.

Specifically interesting variants of the compounds of this invention correspond to the following formulae:

Asymmetrical oxalic acid diarylamides of the formula

(21) 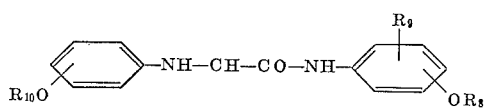

in which $R_8$ represents an alkyl group with 1 to 18 carbon atoms, an alkenyl group with 3 or 4 carbon atoms, an acyl group with 2 to 12 carbon atoms or a benzyl group, $R_9$ may stand for $—O—R_8$ or may stand for a hydrogen or chloroine atom, an alkyl group with up to 12 carbon atoms or a phenyl group, and $R_{10}$ represents an alkyl group with 1 to 4 carbon atoms.

Asymmetrical oxalic acid diarylamides of the formula

(22) 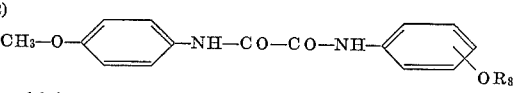

in which $R_8$ stands for an alkyl group with 1 to 18 carbon atoms, an alkenyl group with 3 or 4 carbon atoms, an aryl group with 2 to 12 carbon atoms or a benzyl group.

Asymmetrical oxalic acid diarylamides of the formula

(23) 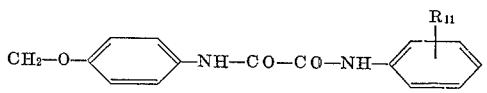

in which $R_{11}$ represents an alkyl group with 1 to 12 carbon atoms, a hydrogen or chlorine atom or a phenyl group.

From the large number of compounds of the above formulae the following compounds may be specially mentioned:

(24) 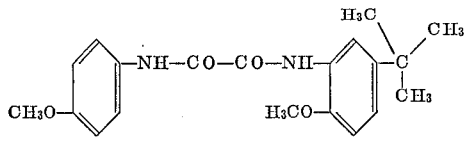

(25) 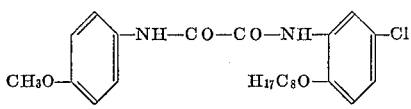

(26) 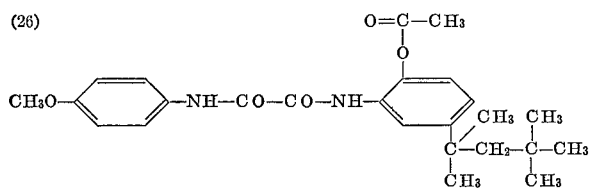

(27) 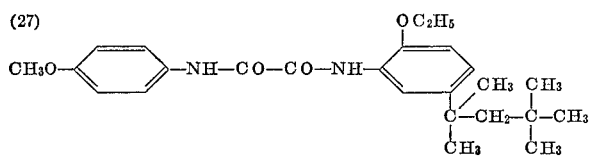

(28) 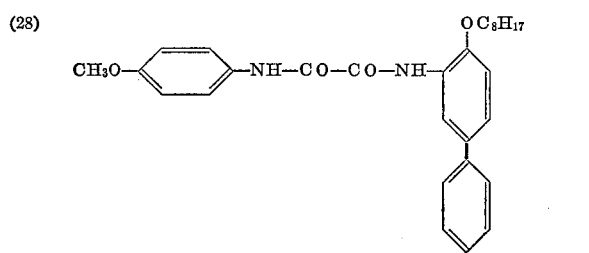

(29) 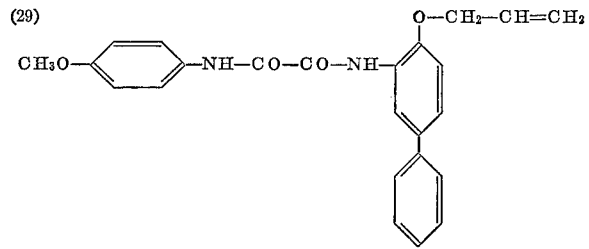

The oxalic acid bis-arylamides of the general Formula 1 to be used in this invention are accessibly by known methods. They are obtained when oxalic acid or an oxalic acid ester is semi-amidated in known manner in the first stage by reacting oxalic acid or an oxalic acid ester, especially an alkyl ester, with an approximately equimolecular quantity of a suitable primary amine A—$NH_2$ or B—$NH_2$ (where A and B have the above meanings). According to a preferred method, for example, oxalic acid, an oxalic acid semi-ester or oxalic acid diester containing identical or different ester residues, is condensed with approximately equimolecular quantities of one of the aforementioned amines in the melt or in an organic solvent that is inert towards the reactants, in the presence of anhydrous boric acid, at a temperature ranging from about 50 to 200° C.

The resulting amide-ester or amide-acid is isolated and then in a second stage the remaining carboxyl group or carboxylate group respectively of the oxalic acid semi-amide is condensed under analogous conditions with a second amine A—$NH_2$ or B—$NH_2$ (which is different from the amine used in the first stage), for which second condensation it is in general advantageous to use a temperature higher by about 50 to 100° C., that is to say a temperature from about 100 to 250° C. In this second condensation approximately equimolecular proportions are normally used as well.

Suitable inert organic solvents, as referred to above, are especially those which boil above about 160° C., for example higher benzene-hydrocarbons or halogenated benzenes such as dichlorobenzenes or trichlorobenzenes.

Alternatively, the second amide grouping may be introduced by semi-hydrolysis of the amide-ester obtained in the first stage to form the amide-acid which is converted into the amide-acid halide, and this is followed by amidation of the acid halide group.

In such primarily obtained oxalic acid diarylamides, which still contain free hydroxy groups, these groups may or must be etherfied or esterified in known manner to satisfy the above general formulae.

According to a preferred process for the manufacture of asymmetrical oxalic acid diarylamides of the Formula 13 the carboxyl groups or carboxylate groups of the oxalic acid or of its semi-esters or diesters are reacted with primary aromatic amines in the presence of anhydrous boric acid (in the melt or in the presence of an inert solvent) in an amount of 0.1 to 5% of the weight of the oxalic acid or of its ester.

Thus, in the case of compounds of the Formula 13, the second stage consists in the condensation of an oxalic acid derivative of the formula (30)

$$\underset{(R_1O)_m}{\overset{(R_3)_{p-1}}{\text{Ar}}}-NH-CO-CO-A_1$$

with an amine of the formula (31)

$$H_2N-\underset{(OZ)_{n-1}}{\overset{(R_4)_{q-1}}{\text{Ar}}}$$

where $R_1$, $R_3$, $R_4$, $m$, $n$, $p$ and $q$ have the above meanings; $A_1$ is a hydroxyl group, a halogen atom or an alkoxy group with 1 to 12 carbon atoms, or a group —O-benzyl or —O-phenyl, and Z stands for a hydrogen atom or equals $R_2$ as defined above—at a temperature from 50 to 250° C., and then free hydroxyl groups are blocked by subsequent etherification or acylation.

Thus, taking into consideration the above statements, the preferred variant of the process for the manufacture of compounds of the general Formula 1 consists in condensing an oxalic acid derivative of the formula (32)

$$\underset{(R_1O)_m}{\overset{(R_3)_{p-1}}{\text{Ar}}}-NH-CO-CO-A_2$$

with an amine of the formula (33)

$$H_2N-\underset{(OZ)_{n-1}}{\overset{(R_4)_{q-1}}{\text{Ar}}}$$

(where $R_1$, $R_3$, $R_4$, Z, $m$, $n$, $p$ and $q$ have the above meanings and $A_2$ represents an alkoxy group with 1 to 12 carbon atoms) in the melt or in a solvent that is inert towards the reactants, in the presence of anhydrous boric acid, at a temperature from 100 to 250° C., whereupon free hydroxyl groups are blocked by etherification or acylation.

In this condensation it is advantageous to use 0.1 to 5% of anhydrous boric acid referred to the weight of oxalic acid derivative, and to use a reaction temperature from 150 to 200° C.

Within the scope of the requirements of Formula 1 there may be used in the present process, for example, the following amines to form in each case one of the two amide groupings:

Aniline, 2-, 3- and 4-chloraniline,
2,4- and 3,4-dichloraniline,
2,4,6-trichloraniline and the corresponding bromanilines,
2-, 3- and 4-fluoraniline,
2- and 4-iodaniline,
3,5-diiodaniline,
2-, 3- and 4-methylaniline,
2,4- and 2,5-dimethylaniline,
2,6-diethylaniline,
2-methyl-5-isopropylaniline,
2-, 3- and 4-methoxyaniline,
2,4- and 2,5-dimethoxyaniline,
2,5-diethoxyaniline,
4-butoxyaniline,
3-trifluoromethylaniline,
3,5-bis-trifluoromethylaniline,
2-, 3- and 4-nitraniline,
3- and 4-hydroxyaniline,
2-aminodiphenyl,
meta- and para-aminoacetanilide,
3- and 4-aminobenzoic acids and their amides,
anthranilic acid and its methyl and ethyl esters,
para-amino-N,N-dimethylaniline,
4-amino-methylbenzoate and -ethylbenzoate,
metanilic acid, sulphanilic acid, metanilamide, sulphanilamide,
4-hydroxy-3,5-di-tertiary butylaniline,
4-hydroxy-3,5-dichloraniline,
4,5-dichlorosulphanilic acid,
2-methoxy-5-methylaniline,
4-methyl-3-chloraniline,
2-chloro-4-trifluoromethylaniline,
2,4-dimethoxy-5-chloraniline and
2,4-dimethyl-6-nitraniline.

From among suitable naphthylamines there may be mentioned: α- and β-naphthylamine, sulphonic acids of the naphthylamines such as 1-naphthylamine-4-, -5- and -8-sulphonic acid,
2-naphthylamine-1- and -5-sulphonic acid,
2-naphthylamine-4,8- and -6,8-disulphonic acid,
8-hydroxy-1-naphthylamine-4-sulphonic acid,
8-hydroxy-2-naphthylamine-6-sulphonic acid,
8-hydroxy-1-naphthylamine-4,6- and 3,6-disulphonic acid and
8-hydroxy-2-naphthylamine-3,6-disulphonic acid.

Hydroxyamines in which a hydroxyl group in ortho-position to the amide nitrogen atom must subsequently be etherified:

2-hydroxyaniline,
2-hydroxy-4- and -5-phenylamine,
2-hydroxy-5-methylaniline,
2-hydroxy-5-chloraniline,
2-hydroxy-5-isooctylaniline,
2-hydroxy-5-dodecylaniline,
2-hydroxy-4-methoxyaniline,
2,4-dihydroxyaniline,
1-hydroxy-2-naphthylamine and
2-hydroxy-1-naphthylamine.

Protection by stabilization can be given with the aid of the oxalic acid diamides described above, in principle, to all those organic materials that are in any form damaged or destroyed by the action of ultraviolet rays. Such damages by the action of the same agency, namely ultraviolet rays, may have very different effects, for example colour shifts, changes in mechanical properties (brittleness, fissuring, tear strength, flexural strength, abrasion resistance, elasticity, ageing), triggering off of undesired chemical reactions (decomposition of delicate chemical substances, for example medicaments), photochemically induced rearrangements, oxidation and the like (for example of oils containing unsaturated fatty acids), causing of burns and irritations (for example on human skin) and the like. Of special importance is the use of the asymmetrical oxalic acid diarylamides defined above for protecting polycondensates and polyadducts from the action of ultraviolet rays.

The organic materials to be protected may be widely differing processing stages and physical states, their common characteristic being their sensitivity towards ultraviolet rays.

As high-molecular and low-molecular substances that can be protected or stabilized by the present process there may be mentioned, for example, without any limitation thereto: Organic natural substances such as are used for pharmaceutical purposes (medicaments), dyestuffs sensitive to ultraviolet rays, compounds which as victuals or in victuals are decomposed by the action of light (unsaturated fatty acids in oils) and the like.

As examples of high-molecular organic substances there may be mentioned:

(I) Synthetic organic materials of high or higher molecular weight such as:

(a) Polymerization products based on organic compounds containing at least one polymerizable carbon-to-carbon double bond, that is to say their homopolymers or copolymers as well as their after-treating products, for example cross-linking, grafting or decomposition products; diluted polymers modification products obtained by modifying reactive groupings in the polymer molecule and the like, for example polymers based on α,β-unsaturated carboxylic acids (for example acrylates, acrylamides, acrylonitrile), of olefinic hydrocarbons, for example α-olefines, ethylene, propylene or dienes, that is to say also rubbers and rubber-like polymers (also so-called ABS polymers), polymers based on vinyl and vinylidene compounds (for example styrene, vinyl esters, vinylchloride, vinyl alcohol), of halogenated hydrocarbons, of unsaturated aldehydes and ketones, allyl compounds and the like;

(b) Other polymerization products obtainable, for example, by ring opening, for instance polyamides of the polycaprolactam type, also formaldehyde polymers, or polymers accessible by polyaddition or polycondensation, such as polyethers, polythioethers, polyacetals, thioplasts;

(c) Polycondensation products or precondensates based on bifunctional or polyfunctional compounds containing condensable groups, their homocondensates and cocondensates as well as their after-treatment products, such, for example, as polyesters, [saturated (e.g., polyethylene terephthalate) or unsaturated (e.g. maleic acid-dialcohol polycondensates and their crosslinked products with copolymerizable vinyl monomers), linear or branched (also those based on polyhydric alcohols, e.g. alkyd resins)], polyamides (e.g. hexamethylenediamine adipate), maleinate resins, melamine resins, phenolic resins (e.g. novolaks), aniline resins, furan resins, carbamide resins and their precondensates and similarly constituted products; polycarbonates, silicone resins and the like;

(d) Polyadducts, such as polyurethanes (crosslinked and not crosslinked); epoxy resins.

(II) Semisynthetic organic materials, for example, cellulose esters and mixed esters (cellulose acetate or propionate), nitrocellulose, cellulose ethers, regenerated cellulose (vicose rayon, cuprammonium cellulose) or their after-treatment products; casein synthetics.

(III) Natural organic materials of animal or vegetable origin, for example those based on cellulose or proteins such as wool, cotton, silk, bast, jute, hemp, pelts and hairs, leathers, finely divided wood pulp, natural resins (such as colophony, especially lacquer resins), gelatin, glues, also rubber, gutta percha, balata and their after-treatment and modification products, degradation products, products accessible by modification of reactive groups.

The organic materials concerned, especially synthetic materials such as polymers of vinychloride, saturated and unsaturated polyesters, celluloses and polyamides, may be at widely differing stages of their processing (raw materials, semi-finished products or finished products) and physical states. They may be in the form of products shaped in a wide variety of ways, that is to say, for example, as predominantly three-dimensional objects such as sections, vessels or components of a great variety, chips or granules, foamed products; predominantly two-dimensional materials such as films, foils, lacquers, impregnations or coatings, or predominantly unidimensional materials such as filaments, fibres, flocks, bristles or wires. The said materials may also be in unshaped states in a wide variety of homogeneous or inhomogeneous forms of distribution and physical states, for example in the form of powders, solutions, normal and reversed emulsions (creams), dispersions, latices, sols, gels, putties, waxes, adhesives or pore fillers, and the like.

Fibrous materials may be used in a wide variety of processing forms of non-textile materials, for example as threads, yarns, fibre fleeces, padding, felts, flocculated materials or as textile fabrics or textile laminates, knitwear, papers, cardboards and the like.

The new stabilizers may also be used, for example, as follows:

(a) In cosmetics, such as perfumes, dyed or undyed soaps and bath salts, skin and face creams, powders repellants and especially sunburn oils and creams;

(b) In admixture with dyestuffs or pigments or as additives to dyebaths, printing, discharge or reserve pastes, also for after-treating dyeings, prints or discharge prints;

(c) In admixture with so-called carriers, antioxidants, other light filters, heat stablizers or chemical bleaches;

(d) In admixture with crosslinking agents or dressing agents such as starch or synthetically produced dressings;

(e) In combination with detergents (the detergents and stabilizers may, if desired, be added separately to the washing liquors);

(f) In gelatin layers used in photography;

(g) In combination with polymeric vehicles (products of polymerization, polycondensation or polyaddition) in which the stabilizers, if desired in addition to other substances, are incorporated in the dissolved or dispersed form, for example in coating, impregnating or binding agents (solutions, dispersions, emulsions) for textiles, fleeces, papers, leathers;

(h) As additives to a wide variety of industrial products to reduce the speed of their ageing, for example as additives to glues, adhesives, paints or the like.

If the protective compounds of this invention are to be used for the treatment of textile organic materials of natural or synthetic origin, for example textile fabrics, they may be applied to the substrate to be protected at any desired phase of the final processing of the latter, such as during a dressing or anticrease finishing or dyeing process or during any other finishing operation, by way of a fixing operation similar to a dyeing process.

Furthermore, the new stabilizers to be used according to this invention are preferably added to or incorporated with the materials prior to or during their shaping. Thus, for example, they may be added to the moulding or injection moulding compositions used in the manufacture of films, foils, tapes or mouldings, or they may be dissolved or dispersed or in any other way finely distributed in the spinning mass before it is spun. The protecting compounds may also be added to the starting substances, reaction mixtures or intermediates used in thhe manufacture of fully synthetic or semisynthetic organic materials, that is to say also before or during the chemical reaction, for example in polycondensation (including precondensates), in a polymerization (including prepolymers) or in a polyaddition.

An important sphere of application of the stabilizers to be used in the invention consists in incorporating these substances in a protective layer used to protect material placed underneath it. This application may take the form of applying the ultraviolet absorber to the surface layer (of a film of a fibre or of a multidimensional shaped object). This can be done for example similar to a dyeing process, or the active substance may be embedded in a polymer (polycondensate or polyadduct) film by one of the known surface coating methods with polymeric substances, or the active substance may be dissolved in a suitable solvent and caused to diffuse or swell into the surface layer. According to another important variant the ultraviolet absorber is embedded in a self-supporting, substantially two-dimensional carrier material, for example a foil or the wall of a vessel, in order to keep ultraviolet rays away from the substance located behind it (relevant examples; shop windows, films, transparent packages, bottles).

From the foregoing it is self-evident that in addition to the protection of the substrate or carrier material containing the ultraviolet absorber also other substances contained in the substrate are protected, for example dyestuffs antioxidants, disinfectants, antistatics and other dressing agents, plasticizers and fillers.

Depending on the type of substance to be protected or stabilized, on its sensitivity or on the form in which the protection and stabilization is to be imparted, the requisite amount of stabilizer may vary within wide limits, for example from about 0.01 to 10% by weight, referred to the amount of substrate to be protected. For most practical purposes, however, a quantity from about 0.05 to 2% will suffice.

Accordingly, as results from the foregoing, the process for protecting organic materials from the effects of ultraviolet radiation and heat consists in homogeneously distributing the oxalic acid diamides described in the organic material to be protected, or applying it to the surface of said material or coating the material to be protected with a filter layer containing one of the compounds mentioned.

In particular, this is advantageously done by homogeneously incorporating the oxalic acid diarylamides described in substance or in the dissolved or dispersed form in an amount of 0.1 to 10%, preferably 0.2 to 2.0% by weight (referred to the weight of the material to be protected) in the organic material to be protected before the latter undergoes its final shaping.

If the substance to be used according to this invention is to be applied to the surface of the substrate to be protected, thus for instance a fibrous material (fabric), this is advantageously done by immersing the substrate to be protected in a liquor in which the ultraviolet absorber is dissolved or dispersed. Suitable relevant solvents are, for example, methanol, ethanol, acetone, ethyl acetate, methylethylketone, cyclohexanol and above all water. The substrate to be treated is left in the liquor for some time, similar to the way that dyeing processes are carried out; as a rule, 10 minutes to 24 hours at 10° to 120° C. suffice, during which, if desired, the liquor may be agitated. Finally, the material is rinsed, if necessary washed, and dried.

In many cases it is advantageous to use the light filters described above in combination with sterically hindered phenols, esters of thiodipropionic acid or organic phosphorus compounds.

Unless otherwise indicated, parts and percentages in the following Manufacturing Instructions and Examples are by weight.

MANUFACTURING INSTRUCTION A1

A mixture of 9.1 parts of the compound of the formula

(34) 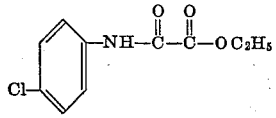

6.5 parts of 3,4-dichloraniline and 0.5 part of boric acid is stirred for 2 hours at 175 to 180° C., while continuously distilling off the alcohol formed. The melt is then dissolved in dimethylformamide and at 20° C. water is added to the solution.

The product of the formula

(35) 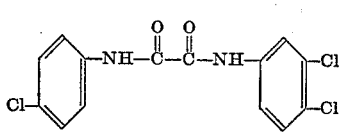

settles out in the form of almost colourless crystals. Yield: about 12 parts.

An analytically pure product obtained by 3 recrystallizations from benezene+methanol melts at 234 to 235° C. and reveals the following data:

Cal'd. for $C_{14}H_9O_2N_2CH_3$ (percent): C, 48.94; H, 2.64; N, 8.15. Found (percent): C, 49.09; H, 2.48; N, 8.17.

In a similar or different manner the compounds listed in the following table were obtained. In this table column I=formula number
columns II+III=definition of the compound
column IV=melting point in ° C. (uncorrected)
column V=analytical data CHN
    1st line: calculated
    2nd line: found Concerning Compounds 45 in Table $D_1$ it should be stated that the $C_{12}H_{25}$-residue is a mixture of different branched isomers (from a tetramerization of 4 propylene molecules).

TABLE $D_1$

(36) 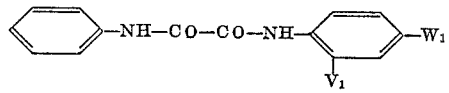

| I | II ($V_1=$) | III ($W_1=$) | IV | V | | |
|---|---|---|---|---|---|---|
| 37 | —H | —NO₂ | 252–253 | 58.94 / 59.20 | 3.89 / 4.00 | 14.73 / 14.60 |
| 38 | —H | —NH₂ | 211–212 | 65.87 / 65.86 | 5.13 / 5.05 | 16.46 / 16.32 |
| 39 | —H | —NH—CO—CH₃ | 295–297 | 64.63 / 64.48 | 5.09 / 4.94 | 14.14 / 14.16 |
| 40 | —H | —COOH | >330 | 63.38 / 63.66 | 4.26 / 4.39 | 9.86 / 10.01 |
| 41 | —H | —COCl | 229–231 | 59.51 / 59.85 | 3.66 / 3.70 | 9.25 / 9.22 |
| 42 | —H | —CONH₂ | >330 | 63.59 / 63.22 | 4.63 / 4.63 | 14.83 / 14.65 |
| 43 | —H | —CO—NH—CH₂CH—CH₂CH₃   \|   (CH₂)₃—CH₃ | 267–269 | 69.85 / 69.87 | 7.39 / 7.28 | 10.63 / 10.72 |
| 44 | —H | —COONa | >330 | 58.83 / 58.59 | 3.62 / 3.70 | 9.15 / 9.28 |
| 45 | —H | —COOC₂H₅ | 202–203 | 65.37 / 65.59 | 5.16 / 5.28 | 8.97 / 8.98 |
| 46 | —H | —C₁₂H₂₅ | 75–90 | 76.43 / 76.56 | 8.88 / 8.61 | 6.86 / 6.91 |
| 47 | —COO—⟨C₆H₄⟩—Cl | —H | 222–223 | 63.89 / 63.65 | 3.90 / 3.99 | 7.10 / 7.19 |
| 48 | —H | —CH₂CH₂—OH | 217–218 | 67.59 / 67.48 | 5.67 / 5.58 | 9.85 / 9.89 |
| 49 | —H | —CH₂COOH | 254–256 | 64.42 / 64.47 | 4.73 / 4.75 | 9.39 / 9.32 |
| 50 | —H | —CH₂CH₂CH₂CH₃ | 178–180 | 72.95 / 72.93 | 6.80 / 6.61 | 9.45 / 9.58 |

TABLE $D_2$
$V_2$—NH—CO—CO—NH—$W_2$

| I | II ($V_2=$) | III ($W_2=$) | IV | V | | |
|---|---|---|---|---|---|---|
| 52 | Cl—⟨C₆H₄⟩— | —⟨C₆H₄⟩—CH₃ | 271–272 | 62.40 / 62.30 | 4.54 / 4.51 | 9.70 / 9.59 |
| 53 | Cl—⟨C₆H₄⟩— | CF₃-⟨C₆H₃⟩-CF₃ | 189–190 | 46.79 / 47.00 | 2.21 / 2.45 | 6.82 / 6.81 |
| 54 | Br—⟨C₆H₄⟩— | Cl-⟨C₆H₃⟩-Cl | 249–250 | 43.33 / 43.24 | 2.34 / 2.24 | 7.22 / 7.25 |
| 55 | Br—⟨C₆H₄⟩— | —⟨C₆H₄⟩—CH₃ | 289–290 | 54.00 / 54.13 | 3.91 / 3.92 | 8.42 / 8.45 |
| 56 | Br—⟨C₆H₄⟩— | CF₃-⟨C₆H₃⟩-Cl | 203–204 | 42.73 / 42.53 | 2.15 / 2.40 | 6.64 / 6.61 |

TABLE D₂—Continued

| I | II(V₂=) | III(W₂=) | IV | V | | |
|---|---|---|---|---|---|---|
| 57 | Br—C₆H₄— | 2,5-(CF₃)₂C₆H₃— | 209–210 | 42.22 / 42.12 | 1.99 / 1.82 | 6.15 / 6.36 |
| 58 | CH₃—C₆H₄— | 2,5-Cl₂C₆H₃— | 227–228 | 55.75 / 56.04 | 3.74 / 3.49 | 8.67 / 8.86 |
| 59 | CH₃—C₆H₄— | 2-CF₃-5-Cl-C₆H₃— | 191–192 | 53.87 / 54.09 | 3.39 / 3.65 | 7.85 / 7.92 |
| 60 | CH₃—C₆H₄— | 2,5-(CF₃)₂C₆H₃— | 165–166 | 52.32 / 52.03 | 3.10 / 3.10 | 7.18 / 7.23 |

TABLE D₃

(61) V₂—NH—CO—CO—NH—W₂

| I | II(V₂=) | (III)W₂= | IV | V | | |
|---|---|---|---|---|---|---|
| 62 | 3,4-(CH₃)₂C₆H₃— | 2,5-Cl₂C₆H₃— | 225–226 | 56.99 / 57.71 | 4.18 / 4.25 | 8.31 / 8.43 |
| 63 | 3,4-(CH₃)₂C₆H₃— | 4-CH₃-C₆H₄— | 205–206 | 72.32 / 72.61 | 6.43 / 6.52 | 9.92 / 10.00 |
| 64 | 3,4-(CH₃)₂C₆H₃— | 2-CF₃-5-Cl-C₆H₃— | 183–184 | 55.07 / 55.17 | 3.81 / 3.97 | 7.56 / 7.56 |
| 65 | 3,4-(CH₃)₂C₆H₃— | 2,5-(CF₃)₂C₆H₃— | 178–179 | 53.47 / 53.77 | 3.49 / 3.60 | 6.93 / 6.92 |
| 66 | naphthyl— | 3,4-(CH₃)₂C₆H₃— | 207–208 | 75.45 / 75.16 | 5.70 / 5.65 | 8.80 / 8.83 |
| 67 | naphthyl— | 4-CH₃-C₆H₄— | 182–183 | 74.98 / 74.71 | 5.30 / 5.24 | 9.21 / 9.24 |
| 68 | naphthyl— | 4-Cl-C₆H₄— | 226–227 | 66.57 / 66.53 | 4.03 / 3.75 | 8.63 / 8.59 |
| 69 | naphthyl— | 4-Br-C₆H₄— | 230–231 | 58.55 / 58.47 | 3.55 / 3.30 | 7.59 / 7.65 |
| 70 | O₂N—C₆H₄— | 4-CF₃-C₆H₄— | 200–201 | 51.00 / 51.18 | 2.85 / 2.79 | 11.90 / 12.00 |

TABLE D₂—Continued $V_2$—NH—CO—CO—NH—$W_2$

| (71) I | II ($V_2$=) | (III $W_2$=) | IV | V | | |
|---|---|---|---|---|---|---|
| 72 | Cl—C₆H₄— | —C₆H₃(CF₃)(Cl) | 188–189 | 47.77 / 47.93 | 2.41 / 2.56 | 7.34 / 7.57 |
| 73 | C₆H₅— | —C₆H₂(CH₃)₃ | 240–242 | 72.32 / 72.02 | 6.43 / 6.46 | 9.92 / 9.76 |
| 74 | N≡C—C₆H₄— | —C₆H₄—Cl | >330 | 60.11 / 60.19 | 3.36 / 3.39 | 14.02 / 14.16 |
| 75 | H₅C₂O—C₆H₄— | —C₆H₄—OH | 277–279 | 63.99 / 63.95 | 5.37 / 5.34 | 9.33 / 9.06 |
| 76 | C₆H₅—C(O)—O—C₆H₄— | —C₆H₄—OH | 302–304 | 67.01 / 66.98 | 4.29 / 4.24 | 7.44 / 7.49 |

EXAMPLES OF USE

In the following examples of use there were used in each case typical representatives of every subgroup of compounds of this invention. In principle, all compounds mentioned in the foregoing description and their equivalents are equally suitable, except that it is only necessary to take into consideration the solubility of the compound concerned in the individual substrate, or to determine it by means of a small-scale test. Finally, it may also be necessary to bear in mind the fact that the absorption maximum of the compound to be incorporated is affected by the substituents in the aromatic residue.

EXAMPLE 1

An acetylcellulose film of about 50μ thickness is produced by pouring a 10% acetonic solution of acetylcellulose containing 1% (referred to the acetylcellulose) of the compound of the Formula 72. After drying, the film reveals the following light transmission values in percent:

| Wavelength in mμ | Light transmission in percent | |
|---|---|---|
| | Unexposed | Exposed [1] |
| 260–310 | 0 | 0 |
| 320 | 5 | 5 |
| 330 | 20 | 20 |
| 340 | 50 | 50 |
| 350 | 75 | 75 |

[1] 100 hours in a fadeometer.

An analogous behaviour is observed, for example, with compounds 29, 48, 66, 68 and 74.

EXAMPLE 2

A paste from 100 parts of polyvinylchloride, 59 parts by volume of dioctylphthalate and 0.2 part of the compound of the Formula 66 is rolled to and fro on a calender at 145 to 150° C. to form a foil about 0.5 mm. thick. The resulting polyvinylchloride foil absorbs in the ultraviolet region from 280 to 350 mμ.

Instead of the compound 66 there may be used, for example, the compound 45, 50, 54, 58 or 62.

EXAMPLE 3

A mixture of 100 parts of polyethylene and 0.2 part of the compound of the Formula 63 is rolled to and fro on a calender at 130 to 140 C. to form a foil which is then pressed at 150° C.

The polyethylene foil obtained in this manner is substantially impermeable to ultraviolet light within the range from 280 to 350 mμ.

Instead of the compound 63 there may be used, for example, the compound 24, 55, 67 or 68.

EXAMPLE 4

A mixture of 100 parts of polypropylene and 0.2 part of the compound of the Formula 50, 53, 56, 66 or 71 is rolled to and fro on a calender at 170° C. to form a sheet which is then pressed at 230 to 240° C. under a maximum pressure of 40 kg./cm.² to form a panel 1 mm. thick.

The panels obtained in this manner are substantially impermeable to ultraviolet light within the region from 280 to 350 mμ. Other compounds listed in the table display a similar behaviour.

EXAMPLE 5

A solution of 0.2 part of the compound of the Formula 26 in 1.8 parts of monostyrene is mixed with 0.2 part of a solution of cobalt naphthenate in monostyrene (containing 1% of cobalt). Then 40 parts of an unsaturated polyester resin based on phthalic acid/maleic acid/ethyleneglycol in monostyrene are added and the whole is stirred for 10 minutes. Then 1.7 parts of a catalyst solution (methylethylketone peroxide in dimethylphthalate) are dropped in and the well-stirred, air-free mass is poured in between two panes of glass. After 20 minutes the polyester panel of 1 mm. thickness has sufficiently solidified to be taken out of the mould. The panel is impermeable to ultraviolet light within the region from 280 to 350 mμ.

Instead of the compound 26 it is possible to use, for example, the compound of the Formula 52 or 53.

EXAMPLE 6

25 grams of distilled monostyrene are prepolymerized in a stoppered bottle in a heating cabinet for 2 days at 90° C., and then 0.25 g. of the compound of the Formula 66, 67, 69 or 72 and 0.025 g. of benzoyl peroxide are slowly stirred in. The mixture is poured into a cubic mould of aluminium foil and heated for 1 day at 70° C. When the mass has completely cooled and solidified, the mould is broken apart. The resulting block is then pressed in a hydraulic press at a temperature of 138° C. under a pressure of 150 kg./cm.² to form a panel 1 mm. thick.

The polystyrene panels manufactured in this manner are impermeable to ultraviolet light within the region from 280 to 350 mμ; they are completely colourless. On exposure in a fadeometer a distinct improvement in the stability to light is observed since polystyrene panels that contain the above compounds of the above formulae do not show any sign of yellowing after 200 hours, while panels that do not contain them have already turned yellow. A similar behaviour is displayed by other compounds listed in the table.

EXAMPLE 7

8 grams of a mixture of toluylene-2,4-diisocyanate and toluylene-2,6-diisocyanate (65:35) and 20 g. of a slightly branched polyester from adipic acid, diethyleneglycol and triol (hydroxyl number: 60) are stirred together for about 15 seconds. Then 2 ml. of a catalyst mixture (consisting of 6 ml. of a tertiary amine, 3 ml. of a dispersant, 3 ml. of a stabilizer and 2 ml. of water) and 0.28 g. of the compound 53, 56, 66 or 72 are added and the whole is stirred for a short time. A foam fleece forms which is immersed in water after 30 minutes. After another 30 minutes it is thoroughly washed with water and dried at room temperature.

The addition of one of the afore-mentioned ultraviolet absorbers improves the stability during the exposure in the xeno test apparatus. The above absorbers also lend themselves well to incorporation with numerous other polyurethanes obtained by the isocyanate polyaddition process.

A similar behaviour is observed also with other compounds listed in the table.

EXAMPLE 8

0.2 gram of the compound of the Formula 26 is dissolved in 10 g. of pure olive oil. The compound dissolves rapidly and without heating. A 50μ-thick layer of this solution absorbs ultraviolet light up to 340 mμ.

In the same manner other fatty oils and creams, or emulsions used for cosmetic purposes may be used for dissolving the above compound and others, for example the compound 53, 60 or 72.

EXAMPLE 9

12 grams of polyacrylonitrile are sprinkled with stirring into 88 g. of dimethylformamide until all has dissolved, and then 0.1 g. of the compound of, for example, Formula 67 is added which dissolves immediately. The viscous mass is then applied to a cleaned pane of glass and spread out with a film drawing rod. The coated pane is then dried for 20 minutes in a vacuum drying cabinet at 120° C. and under a vacuum of 150 mm. Hg. A foil about 0.05 mm. thick is obtained which is easy to detach from the glass support. The foil obtained in this manner is completely colourless and absorbs ultraviolet lights up to a wavelength of 350 mμ almost completely, while a foil not containing the absorber of the Formula 67 passes at least 80% of the ultraviolet light. Incidentally, the compounds mentioned in connection with polystyrene are also suitable for incorporation with polyacrylonitrile.

MANUFACTURING INSTRUCTION A2

A mixture of 22.3 parts of the compound of the formula

(77) 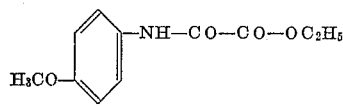

(prepared by condensing the oxalic acid diester $$H_5C_2OCO-COOC_2H_5$$

with para-anisidine in an anhydrous medium containing a catalytic amount of anhydrous boric acid at a temperature from 110 to 115° C.), 10.9 parts of 2-amino-1-phenol and 0.5 part of boric acid is stirred for 2 hours at 175 to 180° C., while continuously distilling off the alcohol formed. The melt is dissolved in dimethylformamide and the solution is mixed with water at 20° C. The product of the formula

(78) 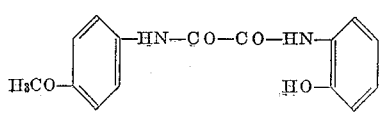

settles out in the form of almost colourless crystals. Yield: about 26 parts. An analytically pure product obtained by three recrystallizations from chlorobenzene melts at 213–214° C. and reveals the following data:

Calculated for $C_{15}H_{14}O_4N_2$ (percent): C, 62.93; H, 4.93; N, 9.79. Found (percent): C, 63.09; H, 5.04; N, 9.86.

2.9 parts of the compound of the Formula 78 are dissolved in a mixture of 10 parts of acetone and 0.4 part of sodium hydroxide in 10 parts of water. 0.1 part of sodium carbonate is added and at 20° C. within 5 minutes 1.4 parts of dimethylsulphate are dropped in. The batch is stirred for another 4 hours at 45° C., mixed with methanol, cooled to 0° C., and the product of the formula

(79) 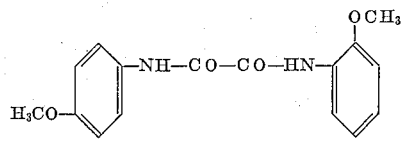

is suctioned off. Yield: about 2.5 parts.

An analytically pure specimen of the product obtained after two crystallizations from benzene melts at 160–161° C. and reveals the following data:

Calculated for $C_{16}H_{16}O_4N_2$ (percent): C, 63.99; H, 5.37; N, 9.33. Found (percent): C, 63.98; H, 5.43; N, 9.31.

MANUFACTURING INSTRUCTION B

A solution of 5.8 parts of the compound of the Formula 78 in 20 parts of dimethylsulphoxide and 0.8 part of sodium hydroxide is mixed at 20° C. with 6.7 parts of n-octadecylbromide, the temperature is raised within 30 minutes to 45° C. and the whole is stirred on for 4 hours at the same temperature. The crystalline magma is then mixed with methanol and the product of the formula

(80) 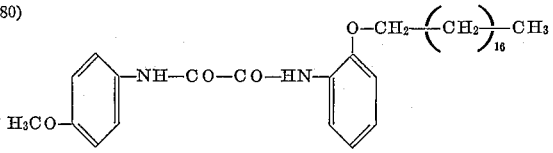

obtained in the form of colourless crystals is suctioned off. Yield: about 10 parts.

An analytically pure specimen obtained after two crystallizations from hexane melts at 90.5 to 91.5° C. and reveals the following data:

Calculated for $C_{33}H_{50}O_4N_2$ (percent): C, 73.56; H, 9.35; N, 5.20. Found (percent): C, 73.81; H, 9.46; N, 5.25.

MANUFACTURING INSTRUCTION C

A mixture of 9 parts of the compound of the Formula

(81) 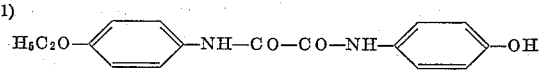

(prepared as described for Compound 78 in Manufacturing Instruction A) in 40 parts of dichlorobenzene and 5.4 parts of capryloylchloride is heated for 2 hours at 120° C. and then for ½ hour at 140° C., during which the mixture dissolves. It is then cooled to 80° C., 50 parts of hot ethanol are added, the whole is cooled and the precipitate suctioned off. The product (11.5 parts) is washed with alcohol and dried at 60° C. in vacuo; it corresponds to the formula

(82) 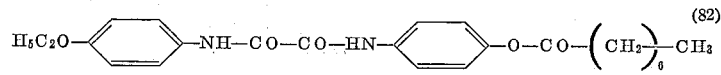

and melts at 219 to 221° C. after recrystallization from chlorobenzene+alcohol.

Analytical data.—Calculated for $C_{24}H_{30}O_5N_2$ (percent): C, 67.58; H, 7.09; N, 6.57. Found (percent): C, 67.65; H, 6.98; N, 6.64.

The compounds listed in the following tables were obtained in an identical or a similar manner. In these tables:

Column I=formula number
Column II=definition of the compound
Column III=melting point in ° C. (uncorrected)
Column IV=analytical data CHN (1st line: calculated, 2nd line: found)

Concerning Compound No. 104 in Table $X_3$ it should be mentioned that the $C_{12}H_{25}$-residue is a mixture of differently branched isomers (from tetramerization of 4 propylene molecules).

Remark: In Tables $X_5$ to $X_{18}$, $X_{21}$, $X_{23}$ to $X_{25}$ there are shown on the right of the general basic formula the melting point and the analytical data of the starting Compound X=H used as intermediate.

TABLE $X_1$

(83) $CH_3O-\langle\phantom{xx}\rangle-NH-CO-CO-NH-X_1$

| I | II ($X_1=$) | III | IV | | |
|---|---|---|---|---|---|
| 84 | 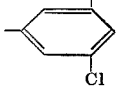 2,3-dimethylphenyl | 196–197 | 68.44<br>68.31 | 6.08<br>6.06 | 9.39<br>9.53 |
| 85 | 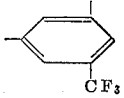 3,5-dimethylphenyl | 191–192 | 68.44<br>68.56 | 6.08<br>5.94 | 9.39<br>9.43 |
| 86 | 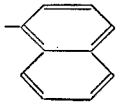 2,5-dichlorophenyl | 233–234 | 53.12<br>53.09 | 3.57<br>3.47 | 8.26<br>8.26 |

TABLE $X_1$—Continued

| I | II ($X_1=$) | III | IV | | |
|---|---|---|---|---|---|
| 87 | 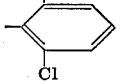 3-CF₃, 4-Cl phenyl | 198–199 | 51.90<br>51.91 | 3.48<br>3.26 | 7.50<br>7.39 |
| 88 | 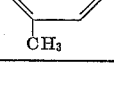 3,5-bis(CF₃) phenyl | 182–183 | 50.26<br>50.82 | 2.98<br>2.79 | 6.90<br>7.04 |
| 89 | 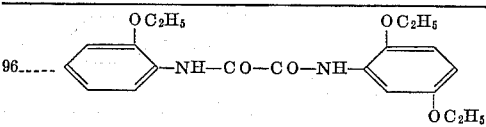 naphthyl | 198–199 | 71.24<br>71.32 | 5.03<br>4.92 | 8.75<br>8.67 |
| 90 | 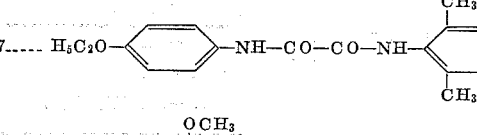 3-I, 4-Cl phenyl | 166–167 | 60.29<br>60.14 | 4.74<br>4.48 | 8.79<br>8.88 |
| 91 | 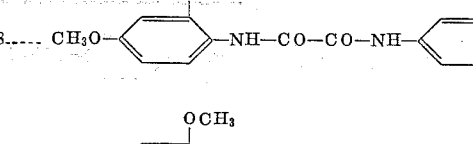 3-methylphenyl | 194–195 | 67.59<br>67.56 | 5.67<br>5.70 | 9.85<br>9.84 |

(241) TABLE $X_2$ $CH_3O-\langle\phantom{xx}\rangle-NH-CO-CO-NH-\langle\phantom{xx}\rangle-X_2$

| I | II ($X_2=$) | III | IV | | |
|---|---|---|---|---|---|
| 92 | —CH₃ | 230–231 | 67.59<br>67.40 | 5.67<br>5.42 | 9.85<br>9.83 |
| 93 | —Br | 280–281 | 51.60<br>51.69 | 3.75<br>3.86 | 8.02<br>7.98 |
| 94 | —Cl | 267–268 | 59.12<br>59.28 | 4.30<br>4.28 | 9.19<br>9.11 |
| 95 | —N(CH₃)₂ | 243–244 | 65.16<br>64.90 | 6.11<br>6.03 | 13.41<br>12.82 |

TABLE $X_3$

| I | II | III | IV | | |
|---|---|---|---|---|---|
| 96 | 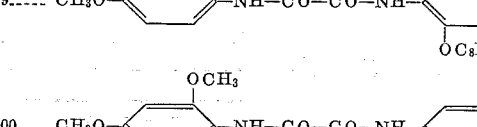 bis(2,4-diethoxyphenyl)oxamide | 122–123 | 64.50<br>64.50 | 6.50<br>6.37 | 7.52<br>7.72 |
| 97 | 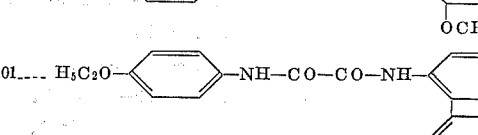 | 237–239 | 69.92<br>69.65 | 6.79<br>6.74 | 8.58<br>8.46 |
| 98 |  | 157–158 | 65.84<br>66.09 | 6.14<br>6.24 | 8.53<br>8.72 |
| 99 | | 110–111 | 69.39<br>69.49 | 8.32<br>8.20 | 5.78<br>5.87 |
| 100 | | 184–185 | 65.27<br>65.16 | 6.78<br>6.88 | 7.25<br>7.33 |
| 101 | | 147–148 | 73.31<br>73.16 | 5.59<br>5.51 | 7.77<br>7.94 |

TABLE X₃—Continued

| I | II | III | IV | | |
|---|---|---|---|---|---|
| 102 | $H_5C_2O-\bigcirc-NH-CO-CO-NH-\bigcirc-CH_2CH_2CH_2CH_3$ | 222–223 | 69.92 / 70.12 | 7.09 / 7.12 | 8.14 / 8.33 |
| 103 | $H_5C_2O-\bigcirc-NH-CO-CO-NH-\bigcirc-CH_2COOH$ | 267–268 | 63.15 / 62.90 | 5.30 / 5.33 | 8.18 / 8.27 |
| 104 | $H_5C_2O-\bigcirc-NH-CO-CO-NH-\bigcirc-C_{12}H_{25}$ | 129–138 | 74.30 / 74.36 | 8.91 / 8.69 | 6.19 / 6.25 |

TABLE X₄

(105) $CH_3O-\bigcirc-NH-CO-CO-NH-X_4$

| I | II | III | IV | | |
|---|---|---|---|---|---|
| 106 | 3,4-(OCH₃)₂-phenyl | 174–175 | 61.81 / 62.09 | 5.49 / 5.34 | 8.48 / 8.48 |
| 107 | 4-(O–CH₂CH₂Cl)-phenyl | 190–191 | 59.59 / 59.28 | 5.28 / 5.01 | 7.72 / 7.71 |
| 108 | 4-OCH₃-3-C(CH₃)₃-phenyl | 173–174 | 67.39 / 67.17 | 6.79 / 6.90 | 7.86 / 7.94 |
| 109 | 4-OC₈H₁₇-3-C(CH₃)₃-phenyl | 93–94 | 71.33 / 71.59 | 8.43 / 8.44 | 6.16 / 6.25 |
| 110 | 4-OC₈H₁₇-phenyl | 92–93 | 69.32 / 69.43 | 7.59 / 7.72 | 7.03 / 7.13 |
| 111 | 3,4-(OCH₃)₂-Cl-phenyl | 189–190 | 55.98 / 56.03 | 4.70 / 4.77 | 7.68 / 7.73 |
| 112 | 4-OCH₃-biphenyl | 187–188 | 70.20 / 70.43 | 5.36 / 5.49 | 7.44 / 7.44 |
| 113 | 4-OC₈H₁₇-biphenyl | 144–146 | 73.39 / 73.79 | 7.22 / 7.25 | 5.90 / 5.90 |
| 114 | 4-(O–CO–CH₂CH₂CH₃)-biphenyl | 135–137 | 69.43 / 69.49 | 5.59 / 5.58 | 6.48 / 6.55 |

TABLE X₅

(115) $CH_3O-\bigcirc-NH-CO-CO-NH-\bigcirc(OX_5)(Cl)$

| | | III | IV | | |
|---|---|---|---|---|---|
| X₅=H: | | 236–237 | 56.17 / 56.17 | 4.09 / 4.02 | 8.73 / 8.67 |

| I | II | III | IV | | |
|---|---|---|---|---|---|
| 116 | –CH₃ | 169–170 | 57.41 / 57.34 | 4.52 / 4.38 | 8.37 / 8.43 |
| 117 | –CH₂CH₂CH₂Cl | 130–131 | 54.42 / 54.52 | 4.57 / 4.48 | 7.05 / 7.04 |
| 118 | –(CH₂)₁₆–CH₃ | 92–93 | 69.15 / 69.20 | 8.62 / 8.67 | 4.89 / 5.01 |

TABLE X₆

(119) $CH_3O-\bigcirc-NH-CO-CO-NH-\bigcirc(OX_6)-\bigcirc$

| I | II (X₆=) | III | IV | | |
|---|---|---|---|---|---|
| 120 | –CH₃ | 188–189 | 70.20 / 70.04 | 5.36 / 5.11 | 7.44 / 7.63 |
| 121 | –C₈H₁₇ | 145–146 | 73.39 / 73.45 | 7.22 / 7.29 | 5.90 / 5.81 |
| 122 | –CH₂–COOC₂H₅ | 193–194 | 66.90 / 66.91 | 5.39 / 5.35 | 6.24 / 6.23 |
| 123 | –CH₂CH₂CH₂–Cl | 160–161 | 65.68 / 65.26 | 5.28 / 5.42 | 6.38 / 6.47 |

TABLE X₇

(124) $CH_3O-\bigcirc-NH-CO-CO-NH-\bigcirc(OX_7)(CH_3)(CH_3)$

| | | III | IV | | |
|---|---|---|---|---|---|
| X₇=H: | | 226–227 | 64.95 / 65.07 | 5.77 / 5.80 | 8.91 / 8.82 |

| I | II (X₇=) | III | IV | | |
|---|---|---|---|---|---|
| 125 | –CH₃ | 163–164 | 65.84 / 65.79 | 6.14 / 6.24 | 8.53 / 8.61 |
| 126 | –C₈H₁₇ | 116–117 | 70.39 / 70.69 | 8.03 / 7.97 | 6.57 / 6.69 |
| 127 | –CH₂CH₂CH₂Cl | 131–132 | 61.46 / 61.20 | 5.93 / 5.97 | 7.17 / 7.13 |

TABLE X₈

(128) $CH_3O-\bigcirc-NH-CO-CO-NH-\bigcirc(OX_8)-C(CH_3)_2-CH_2-C(CH_3)_3$

| | | III | IV | | |
|---|---|---|---|---|---|
| X₈=H: | | 226–228 | 69.32 / 69.15 | 7.59 / 7.36 | 7.03 / 7.16 |

| I | II (X₈=) | III | IV | | |
|---|---|---|---|---|---|
| 129 | –CO–CH₃ | 154–155 | 68.16 / 68.23 | 7.32 / 7.20 | 6.36 / 6.43 |
| 130 | –CO–(CH₂)₁₀–CH₃ | 56–57 | 72.13 / 72.55 | 9.34 / 9.05 | 4.81 / 4.92 |
| 131 | –CH₃ | 152–154 | 69.88 / 70.02 | 7.82 / 7.76 | 6.79 / 6.74 |
| 132 | –(CH₂)₇–CH₃ | 86–88 | 72.90 / 72.54 | 9.08 / 8.86 | 5.49 / 5.70 |
| 133 | –CH₂–CH=CH₂ | 116–118 | 71.20 / 71.44 | 7.82 / 7.80 | 6.39 / 6.46 |
| 134 | –CH₂–phenyl | 104–106 | 73.69 / 73.48 | 7.43 / 7.55 | 5.73 / 5.70 |

TABLE X₉

(135) $H_5C_2O-\text{C}_6H_4-NH-CO-CO-NH-\text{C}_6H_4-OX_9$

| X₉=H: | | 229-230 | 63.99 | 5.37 | 9.30 |
| | | | 64.05 | 5.51 | 9.19 |

| I | II (X₉=) | III | IV | | |
|---|---|---|---|---|---|
| 136 | —CH₃ | 155-156 | 64.95 | 5.77 | 8.91 |
| | | | 64.97 | 5.82 | 9.01 |
| 137 | —CO—CH=CH₂ | 150-151 | 64.40 | 5.10 | 7.90 |
| | | | 64.06 | 5.12 | 7.87 |
| 138 | —C₈H₁₇ | 94-95 | 69.88 | 7.82 | 6.79 |
| | | | 69.83 | 7.55 | 6.76 |
| 139 | —CH₂CH₂CH₂Cl | 139-140 | 60.56 | 5.62 | 7.43 |
| | | | 60.70 | 5.56 | 7.61 |
| 140 | —CH₂—C₆H₅ | 166-167 | 70.75 | 5.68 | 7.18 |
| | | | 70.81 | 5.71 | 7.39 |
| 141 | —CH₂COOC₂H₅ | 152-153 | 62.16 | 5.74 | 7.25 |
| | | | 62.28 | 5.72 | 7.51 |
| 142 | —CO—CH₃ | 147-148 | 63.15 | 5.30 | 8.18 |
| | | | 63.89 | 5.84 | 8.10 |
| 143 | —CH₂CH₂—O—CH₂CH₂—CN | 131-132 | 63.46 | 5.83 | 10.58 |
| | | | 63.89 | 5.84 | 10.13 |
| 144 | —CH₂—COOH | 193-194 | 60.33 | 5.06 | 7.82 |
| | | | 60.37 | 5.11 | 7.77 |
| 145 | —CH₂—CONH—C₆H₅ | 252-253 | 65.54 | 5.50 | 9.97 |
| | | | 65.62 | 5.31 | 9.66 |
| 146 | —CH₂COOC₁₂H₂₅ | 115-116 | 68.41 | 8.04 | 5.32 |
| | | | 68.19 | 7.79 | 5.33 |
| 147 | —CO—C₆H₅ | 167-168 | 68.30 | 4.99 | 6.93 |
| | | | 68.21 | 5.13 | 6.96 |
| 148 | —CO—C₆H₄—Cl | 205-206 | 62.95 | 4.36 | 6.38 |
| | | | 62.92 | 4.41 | 6.53 |
| 149 | —CO—C₆H₄—C(CH₃)₃ | 182-183 | 70.42 | 6.13 | 6.08 |
| | | | 70.06 | 6.45 | 6.36 |
| 150 | —CO—NH—C₄H₉ | 161-162 | 63.14 | 6.31 | 10.52 |
| | | | 63.19 | 6.21 | 10.36 |

TABLE X₁₀

(151) $H_5C_2O-\text{C}_6H_4-NH-CO-CO-NH-\text{C}_6H_3(OX_{10})(C(CH_3)_3)$

| X₁₀=H | | 226-227 | 67.39 | 6.79 | 7.86 |
| | | | 67.19 | 6.74 | 7.91 |

| I | II (X₁₀=) | III | IV | | |
|---|---|---|---|---|---|
| 152 | —CH₃ | 161-162 | 68.09 | 7.07 | 7.56 |
| | | | 68.03 | 6.94 | 7.82 |
| 153 | —C₄H₉ | 124-125 | 69.88 | 7.82 | 6.79 |
| | | | 70.05 | 7.93 | 6.62 |
| 154 | —C₈H₁₇ | 90-91 | 71.76 | 8.60 | 5.98 |
| | | | 71.71 | 8.71 | 6.05 |
| 155 | —C₁₂H₂₅ | 94-95 | 73.24 | 9.22 | 5.34 |
| | | | 73.29 | 9.18 | 5.54 |
| 156 | —C₁₈H₃₇ | 98-99 | 74.95 | 9.93 | 4.60 |
| | | | 75.25 | 10.10 | 4.87 |
| 157 | —CO—CH=CH₂ | 151-152 | 67.30 | 6.39 | 6.83 |
| | | | 67.47 | 6.43 | 6.97 |

TABLE X₁₁

(158) $H_5C_2O-\text{C}_6H_4-NH-CO-CO-NH-\text{C}_6H_4-(OX_{11})(C_6H_5)$

| X₁₁=H: | | 267-268 | 70.20 | 5.36 | 7.44 |
| | | | 70.12 | 5.47 | 7.32 |

| I | II (X₁₁=) | III | IV | | |
|---|---|---|---|---|---|
| 159 | —CH₃ | 186-187 | 70.75 | 5.68 | 7.18 |
| | | | 71.00 | 5.82 | 7.11 |
| 160 | —C₄H₉ | 181-182 | 72.20 | 6.53 | 6.48 |
| | | | 72.23 | 6.70 | 6.66 |
| 161 | —C₈H₁₇ | 158-159 | 73.74 | 7.43 | 5.73 |
| | | | 73.96 | 7.44 | 5.77 |
| 162 | —C₁₂H₂₅ | 150-151 | 74.96 | 8.14 | 5.14 |
| | | | 75.33 | 8.21 | 5.02 |
| 163 | —C₁₈H₃₇ | 135-136 | 76.39 | 8.98 | 4.46 |
| | | | 76.55 | 9.02 | 4.46 |
| 164 | —CH₂—C₆H₅ | 185-186 | 74.66 | 5.62 | 6.01 |
| | | | 74.46 | 5.59 | 6.05 |
| 165 | —CH₂—COOC₂H₅ | 198-199 | 67.52 | 5.67 | 6.06 |
| | | | 67.43 | 5.61 | 6.13 |
| 166 | —CO—CH₃ | 201-202 | 68.89 | 5.30 | 6.70 |
| | | | 68.86 | 5.53 | 6.96 |

TABLE X₁₂

(167) $H_5C_2O-\text{C}_6H_4-NH-CO-CO-NH-\text{C}_6H_3(OX_{12})(C(CH_3)_2C_6H_5)$

| X₁₂H: | | 211-213 | 71.75 | 6.26 | 6.69 |
| | | | 71.54 | 6.09 | 6.89 |

| I | II (X₁₂=) | III | IV | | |
|---|---|---|---|---|---|
| 168 | —C₂H₅ | 155-156 | 72.62 | 6.77 | 6.27 |
| | | | 72.53 | 6.65 | 6.35 |
| 169 | —C₈H₁₇ | 88-89 | 74.68 | 7.98 | 5.28 |
| | | | 74.49 | 7.94 | 5.40 |

TABLE X₁₃

(170) $C_6H_5-NH-CO-CO-NH-C_6H_4-OX_{13}$

| X₁₃=H: | | 261-262 | 65.62 | 4.72 | 10.93 |
| | | | 65.64 | 4.82 | 11.13 |

| I | II (X₁₃=) | III | IV | | |
|---|---|---|---|---|---|
| 171 | —CH₃ | 170-171 | 66.65 | 5.22 | 10.37 |
| | | | 66.69 | 5.33 | 10.16 |
| 172 | —CH₂CH₂CH₂Cl | 91-92 | 61.36 | 5.15 | 8.42 |
| | | | 61.30 | 5.24 | 8.64 |
| 173 | —C₈H₁₇ | 86-87 | 71.71 | 7.66 | 7.60 |
| | | | 71.95 | 7.64 | 7.58 |
| 174 | —CH₂—C₆H₅ | 167-168 | 72.82 | 5.24 | 8.09 |
| | | | 73.15 | 5.25 | 7.91 |

TABLE X₁₄

$C_6H_5-NH-CO-CO-NH-C_6H_3(OX_{14})(C(CH_3)_3)$

| X₁₄=H: | | 201-202 | 69.21 | 6.45 | 8.97 |
| | | | 68.99 | 6.36 | 9.00 |

| I | II (X₁₄=) | III | IV | | |
|---|---|---|---|---|---|
| 176 | —CH₃ | 132-133 | 69.92 | 6.79 | 8.58 |
| | | | 69.94 | 6.86 | 8.85 |
| 177 | —CH₂CH₂CH₂Cl | 96-97 | 64.86 | 6.48 | 7.20 |
| | | | 64.98 | 6.24 | 7.21 |
| 178 | —C₈H₁₇ | 99-100 | 73.55 | 8.55 | 6.60 |
| | | | 73.79 | 8.69 | 6.36 |
| 179 | —CH₂—C₆H₅ | 182-183 | 74.60 | 6.51 | 6.96 |
| | | | 74.75 | 6.58 | 7.03 |
| 180 | —C₁₂H₂₅ | 76-77 | 74.96 | 9.23 | 5.83 |
| | | | 75.15 | 9.40 | 5.92 |
| 181 | —CO—CH₃ | 181-182 | 67.78 | 6.26 | 7.91 |
| | | | 67.98 | 6.25 | 7.95 |

TABLE X₁₅

(182) $C_6H_5-NH-CO-CO-NH-C_6H_4-(OX_{15})(C_6H_5)$

| I | II (X₁₅=) | III | IV | | |
|---|---|---|---|---|---|
| 183 | —CH₃ | 189-190 | 72.82 | 5.24 | 8.09 |
| | | | 72.55 | 5.26 | 8.02 |
| 184 | —CH₂—COOC₂H₅ | 182-183 | 68.89 | 5.30 | 6.70 |
| | | | 68.93 | 5.34 | 6.76 |
| 185 | —C₁₈H₃₇ | 114-115 | 78.04 | 8.96 | 4.79 |
| | | | 78.29 | 8.93 | 4.74 |

TABLE X₁₆

(186) $CH_3-\phenyl-NH-CO-CO-NH-\phenyl(OX_{16})(C(CH_3)_3)$

| | | | | |
|---|---|---|---|---|
| $X_{16}$=H: | 228–229 | 69.92 | 6.79 | 8.58 |
| | | 79.71 | 6.49 | 8.58 |

| I | II ($X_{16}$=) | III | IV | | |
|---|---|---|---|---|---|
| 187 | —$CH_3$ | 169–170 | 70.56 | 7.11 | 8.23 |
| | | | 70.81 | 7.32 | 8.12 |
| 188 | —$CH_2CH_2CH_2$—Cl | 114–115 | 65.58 | 6.75 | 6.95 |
| | | | 65.69 | 6.73 | 7.23 |
| 189 | —$C_8H_{17}$ | 92–93 | 73.94 | 8.73 | 6.35 |
| | | | 73.98 | 8.96 | 6.38 |
| 190 | —$CH_2$—phenyl | 171–172 | 74.97 | 6.78 | 6.73 |
| | | | 75.04 | 7.00 | 6.50 |

TABLE X₁₇

(191) $CH_3-\phenyl-NH-CO-CO-NH-\phenyl(OX_{17})$

| | | | | |
|---|---|---|---|---|
| $X_{17}$=H: | 221–222 | 66.65 | 5.22 | 10.37 |
| | | 66.70 | 5.27 | 10.26 |

| I | II ($X_{17}$=) | III | IV | | |
|---|---|---|---|---|---|
| 192 | —$CH_3$ | 165–166 | 67.59 | 5.67 | 9.85 |
| | | | 67.89 | 5.87 | 9.81 |
| 193 | —$C_4H_9$ | 103–104 | 69.92 | 6.79 | 8.57 |
| | | | 69.78 | 6.79 | 8.32 |
| 194 | —$C_8H_{17}$ | 95–96 | 72.22 | 7.91 | 7.32 |
| | | | 72.52 | 7.89 | 7.55 |

TABLE X₁₈

(195) $Cl-\phenyl-NH-CO-CO-NH-\phenyl(OX_{18})$

| | | | | |
|---|---|---|---|---|
| $X_{18}$=H: | 246–247 | 57.84 | 3.81 | 9.64 |
| | | 58.00 | 3.84 | 9.67 |

| I | II ($X_{18}$=) | III | IV | | |
|---|---|---|---|---|---|
| 196 | —$CH_3$ | 212–213 | 59.12 | 4.30 | 9.19 |
| | | | 59.31 | 4.33 | 9.22 |
| 197 | —$C_2H_5$ | 187–189 | 69.29 | 4.74 | 8.79 |
| | | | 60.04 | 4.97 | 8.99 |
| 198 | —$C_4H_9$ | 116–117 | 62.34 | 5.52 | 8.08 |
| | | | 62.42 | 5.51 | 8.02 |
| 199 | —$C_8H_{17}$ | 94–95 | 65.58 | 6.75 | 6.95 |
| | | | 65.61 | 6.63 | 7.09 |

TABLE X₁₉

(200) $Cl-\phenyl-NH-CO-CO-NH-X_{19}$

| I | II ($X_{19}$=) | III | IV | | |
|---|---|---|---|---|---|
| 201 | $OCH_3$-phenyl-$OCH_3$ | 189–190 | 57.41 | 4.52 | 8.37 |
| | | | 57.42 | 4.29 | 8.33 |
| 202 | $OC_8H_{17}$-phenyl-phenyl | 147–148 | 70.21 | 6.52 | 5.85 |
| | | | 69.90 | 6.48 | 5.98 |
| 203 | $OCH_3$-phenyl-$C(CH_3)_3$ | 172–173 | 63.24 | 5.87 | 7.76 |
| | | | 62.69 | 5.80 | 7.71 |
| 204 | $OC_8H_{17}$-phenyl-$C(CH_3)_3$ | 116–117 | 68.03 | 7.69 | 6.10 |
| | | | 68.17 | 7.70 | 5.89 |

TABLE X₂₀

| I | II | III | IV | | |
|---|---|---|---|---|---|
| 205 | NC—phenyl—NH—CO—CO—NH—phenyl($OC_2H_5$) | 217–218 | 66.01 | 4.89 | 13.59 |
| | | | 65.98 | 4.91 | 13.65 |
| 206 | phenyl-phenyl—NH—CO—CO—NH—phenyl($OCH_3$)($C(CH_3)_3$) | 188–189 | 74.60 | 6.51 | 6.96 |
| | | | 74.55 | 6.65 | 6.97 |

TABLE X₂₁

(207) 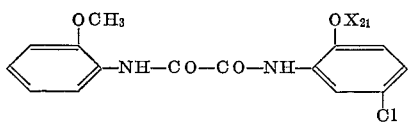

| I | II ($X_{21}$=) | III | IV | | |
|---|---|---|---|---|---|
| 208 | —$CH_3$ | 209–210 | 57.41 | 4.52 | 8.37 |
| | | | 57.39 | 4.49 | 8.44 |
| 209 | —$C_8H_{17}$ | 91–92 | 63.81 | 6.75 | 6.47 |
| | | | 64.10 | 6.76 | 6.49 |
| 210 | —$CH_2CH_2CH_2$—Cl | 146–147 | 54.42 | 4.57 | 7.05 |
| | | | 54.32 | 4.76 | 7.00 |
| 211 | —$CH_2$—phenyl | 176–177 | 64.31 | 4.66 | 6.82 |
| | | | 64.68 | 4.51 | 6.79 |
| 212 | —$CH_2$—$COOC_2H_5$ | 161–162 | 56.10 | 4.71 | 6.89 |
| | | | 56.28 | 4.65 | 6.87 |
| 213 | —$CO$—$CH_3$ | 167–168 | 56.29 | 4.17 | 7.72 |
| | | | 56.33 | 4.13 | 7.81 |

TABLE X₂₂

(214) 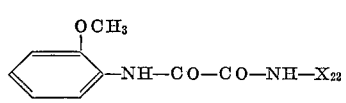

| I | II ($X_{22}$=) | III | IV | | |
|---|---|---|---|---|---|
| 215 | $OC_8H_{17}$-phenyl-$C(CH_3)_3$ | 119–120 | 71.33 | 8.43 | 6.16 |
| | | | 71.21 | 8.39 | 6.42 |
| 216 | $OC_8H_{17}$-phenyl | 117–118 | 69.32 | 7.59 | 7.03 |
| | | | 69.59 | 7.31 | 7.18 |
| 217 | $OCH_2CH_2CH_2$—Cl-phenyl | 146–147 | 59.59 | 5.28 | 7.72 |
| | | | 59.94 | 5.17 | 7.81 |
| 218 | $O-CH_2$-phenyl | 189–190 | 70.20 | 5.36 | 7.44 |
| | | | 70.25 | 5.46 | 7.37 |
| 219 | $O-CH_2-COOC_2H_5$-phenyl | 155–156 | 61.28 | 5.41 | 7.52 |
| | | | 61.06 | 5.39 | 7.66 |
| 220 | $O-CO-CH_3$-phenyl | 139–140 | 62.19 | 4.91 | 8.53 |
| | | | 61.93 | 5.01 | 8.76 |

TABLE X₂₃

(221)

NH—CO—CO—NH—⌬—OX₂₃ (biphenyl-phenyl structure)

| I | II (X₂₃=) | | III | IV | | |
|---|---|---|---|---|---|---|
| | X₂₃=H: | 203–204 | { | 72.28 | 4.85 | 8.43 |
| | | | | 72.08 | 4.69 | 8.27 |
| 222 | —CH₃ | 145–146 | { | 72.82 | 5.24 | 8.09 |
| | | | | 72.58 | 5.32 | 8.04 |
| 223 | —C₈H₁₇ | 105–106 | { | 75.65 | 7.26 | 6.30 |
| | | | | 75.58 | 7.40 | 6.41 |
| 224 | —CH₂CH₂CH₂Cl | 148–149 | { | 67.56 | 5.18 | 6.85 |
| | | | | 67.89 | 5.32 | 6.65 |

TABLE X₂₄

(225)

NH—CO—CO—NH—⌬—OX₂₄ with C(CH₃)₃ substituent

| I | II (X₂₄=) | | III | IV | | |
|---|---|---|---|---|---|---|
| | X₂₄=H: | 227–228 | { | 74.20 | 6.27 | 7.21 |
| | | | | 73.63 | 6.34 | 7.24 |
| 226 | —CH₃ | 190–191 | { | 74.60 | 6.51 | 6.96 |
| | | | | 74.70 | 6.56 | 7.16 |
| 227 | —C₈H₁₇ | 149–150 | { | 76.76 | 8.05 | 5.60 |
| | | | | 76.48 | 8.09 | 5.75 |
| 228 | —CH₂—CH₂—CH₂—Cl | 168–169 | { | 69.74 | 6.29 | 6.02 |
| | | | | 69.65 | 6.04 | 6.16 |
| 229 | —CO—CH₃ | 166–167 | { | 72.54 | 6.09 | 6.51 |
| | | | | 72.35 | 6.16 | 6.35 |
| 230 | —CH₂—COOC₂H₅ | 157–158 | { | 70.86 | 6.37 | 5.90 |
| | | | | 70.77 | 6.38 | 6.20 |

TABLE X₂₅

(231)

H₅C₂O—⌬—NH—CO—CO—NH—⌬—OX₂₅

| I | II (X₂=) | | III | IV | | |
|---|---|---|---|---|---|---|
| | X₂₅=H: | 280–282 | { | 63.99 | 5.37 | 9.33 |
| | | | | 63.95 | 5.34 | 9.06 |
| 232 | —CO—⌬ | 270–272 | { | 68.30 | 4.99 | 6.93 |
| | | | | 68.21 | 4.88 | 6.94 |
| 233 | —CO—⌬—C(CH₃)₃ | 281–282 | { | 70.42 | 6.13 | 6.08 |
| | | | | 70.60 | 6.10 | 6.25 |
| 234 | —CO—NH—CH₂CH₂CH₂CH₃ | 272–275 | { | 63.14 | 6.31 | 10.52 |
| | | | | 63.40 | 6.03 | 10.31 |
| 235 | —CH₃ | 229–230 | { | 64.95 | 5.77 | 8.91 |
| | | | | 64.72 | 5.54 | 9.04 |
| 236 | —C₄H₉ | 228–229 | { | 67.39 | 6.79 | 7.86 |
| | | | | 67.54 | 6.63 | 7.94 |
| 237 | —C₈H₁₇ | 205–206 | { | 69.88 | 7.82 | 6.79 |
| | | | | 69.71 | 7.52 | 6.84 |
| 238 | —C₁₂H₂₅ | 202–203 | { | 71.76 | 8.60 | 5.98 |
| | | | | 71.70 | 8.50 | 6.05 |
| 239 | —CH₂—⌬ | 245–246 | { | 70.75 | 5.68 | 7.18 |
| | | | | 70.62 | 5.59 | 7.26 |
| 240 | —CH₂—CH=CH₂ | 243–244 | { | 67.04 | 5.92 | 8.23 |
| | | | | 66.91 | 5.67 | 8.12 |

EXAMPLE 10

An acetylcellulose film about 50μ thick is produced by pouring out a 10% acetonic solution of acetylcellulose containing 1% (calculated from acetylcellulose) of the compound of the Formula 106. The dried film reveals the following light transmission values in percent:

| Wavelength in mμ | Light transmission in percent | |
|---|---|---|
| | Unexposed | Exposed [1] |
| 260–340 | 0 | 0 |
| 350 | 3 | 3 |
| 360 | 10 | 10 |
| 370 | 30 | 30 |
| 380 | 55 | 55 |

[1] 100 hours in a fadeometer.

A similar behaviour is observed, for example, with the compound of the Formula 93, 138, 149, 152, 171, 201 or 208.

EXAMPLE 11

A paste from 100 parts of polyvinylchloride, 59 parts by volume of dioctylphthalate and 0.2 part of the compound of the Formula 79 is rolled to and fro on a calender at 145 to 150° C. to form a foil about 0.5 mm. thick. The polyvinylchloride foil obtained in this manner absorbs ultraviolet light within the region from 280 to 360 mμ.

Instead of the compound of the Formula 79 there may be used, for example, the compound of the Formula 96, 97, 110, 117, 136, 152, 168, 176, 208, 222 or 233.

EXAMPLE 12

A mixture of 100 parts of polyethylene and 0.2 part of the compound of the Formula 107 is rolled to and fro on a calender at 130 to 140° C. to form a foil which is then pressed at 150° C.

The polyethylene foil obtained in this manner is substantially impermeable to ultraviolet light within the region from 280 to 350 mμ.

Instead of the compound of the Formula 107 there may be used, for example, the compound of the Formula 100, 110, 146, 161, 172, 189, 209 or 223.

EXAMPLE 13

A mixture of 100 parts of polypropylene and 0.2 part of the compound of the Formula 99, 121, 138, 168, 180, 189, 199, 204, 209, 210 or 224 is turned on a calender at 170° C. into a sheet which is then pressed at 230 to 240° C. under a maximum pressure of 40 kg./cm.² to form a panel 1 mm. thick.

The panels obtained in this manner are substantially impermeable to ultraviolet light within the region from 280 to 360 mμ. Other compounds listed in the table reveal a similar behaviour.

EXAMPLE 14

A solution of 0.2 part of the compound of the Formula 79 in 1.8 parts of monostyrene is mixed with 0.5 part of a solution of cobalt naphthenate in monostyrene (containing 1% of cobalt). Then 40 parts of an unsaturated polyester resin based on phthalic acid/maleic acid/ethyleneglycol in monostyrene are added and the whole is stirred for 10 minutes. 1.7 parts of a catalyst solution (methylethyl ketone peroxide in dimethylphthalate) are dropped in and the well-stirred, air-free mass is poured in between two panes of glass. After about 20 minutes the polyester panel of about 1 mm. thickness has sufficiently solidified to be taken out of the mould; it is impermeable to ultraviolet light within the region from 280 to 350 mμ and reveals no sign of yellowing after 1000 hours' exposure in the xeno test.

Instead of the compound of the Formula 79 there may be used, for example, the compound of the Formula 84, 122, 141, 159, 165, 176, 187, 211 or 227.

EXAMPLE 15

25 grams of distilled monostyrene are prepolymerized in a stoppered flask in a heating cabinet for 2 days at 90° C. Then 0.25 g. of the compound of the Formula 107, 114, 117, 126, 157, 178, 220 or 227 and 0.025 g. of benzoyl peroxide are slowly stirred into the viscous mass. The mixture is poured into a cubic mould made from aluminium foil and heated for 1 day at 70° C. After the mass has completely cooled and solidified, the mould is broken apart. The resulting block is then pressed in a hydraulic press at 138° C. under a pressure of 150 kg./cm.² to form a panel 1 mm. thick.

The polystyrene panels manufactured in this manner are impermeable to ultraviolet light within the region from 280 to 350 mμ; they are completely colourless. On exposure in a fadeometer a distinct improvement in the stability towards light is observed since polystyrene panels containing a compound of the above formulae display no sign of yellowing after 200 hours' exposure, while panels that do not contain such an absorber have already become yellow. Similar results are obtained with other compounds listed in the table.

EXAMPLE 16

0.1 gram of the compound of the Formula 78, 123, 130, 141, 156, 181, 192, 209, 224 or 233 is dissolved in 40 g. of clear nitrocellulose lacquer of 25% strength. The lacquer is then evenly spread over maple boards with a coating doctor and is completely dry after a short time. The addition of the above-mentioned ultraviolet absorbers does not change the shade of the wood. The light colour of the lacquered wood is not changed either after several days' exposure to the light of an ultraviolet lamp, provided the lacquer contains one of the above-mentioned compounds in a concentration of about 1%. Untreated wood darkens after only a few days' exposure as described.

Similar results are obtained by using acrylic resin lacquers of alkyd-melamine resin lacquers and other compounds listed in the table.

EXAMPLE 17

8 grams of a mixture of toluylene-2,4-diisocyanate and toluylene-2,6-diisocyanate (65:35) and 20 g. of a slightly branched polyester from adipic acid, diethyleneglycol and triol (hydroxyl number: 60) are stirred together for about 15 seconds. Then 2 ml. of a catalyst mixture (consisting of 6 ml. of a tertiary amine, 3 ml. of a dispersant, 3 ml. of a stabilizer and 2 ml. of water) and 0.28 g. the compound (100), (107), (132), (150), (154), (187), (208) or (223) are added and the whole is stirred for a short time. A foam fleece forms which is immersed in water after 30 minutes. After another 30 minutes it is thoroughly washed with water and dried at room temperature.

The addition of one of the afore-mentioned ultraviolet absorbers improves the stability during the exposure in the xeno test apparatus. The above absorbers also lend themselves well to incorporation with numerous other polyurethanes obtained by the isocyanate polyaddition process.

A similar behaviour is observed also with other compounds listed in the table.

EXAMPLE 18

10,000 parts of a polyamide in chip form, prepared in fInown manner from caprolactam, are mixed for 12 hours with 30 parts of the compound of the Formula 107, 165, 184 or 208 in a tumbler. The chips treated in this manner are then melted in a boiler heated at 300° C., from which the atmospheric oxygen has been displaced with superheated steam, and the melt is stirred for ½ hour, then expressed through a spinneret under a nitrogen pressure of 5 atmospheres (gauge), and the resulting, cooled filament is wound on a spinning top, whereby it is at the same time stretched.

The addition of the above-mentioned compounds substantially inhibits the degradation of the macromolecules caused during the exposure in the fadeometer and determined by measuring the relative viscosity in concentrated sulphuric acid. Other compounds of the table behave similarly.

EXAMPLE 19

0.3 gram of the compounds of the Formula 80 is dissolved in 10 g. of pure olive oil. The compound dissolves rapidly and without heating. A 50μ-thick layer of this solution absorbs ultraviolet light up to 340 mμ.

In the same manner other fatty oils and creams, or emulsions used for cosmetic purposes may be used for dissolving the above compound and others, for example the compound (107), (138), (155), (178) or (189).

EXAMPLE 20

12 grams of polyacrylonitrile are sprinkled with stirring into 88 g. of dimethylformamide until all has dissolved, and then 0.1 g. of the compound of, for example, Farmula 79 is added which dissolves immediately. The viscous mass is then applied to a cleaned pane of glass and spread out with a film drawing rod. The coated pane is then dried for 20 minutes in a vacuum drying cabinet at 120° C. and under a vacuum of 150 mm. Hg. A foil about 0.05 mm. thick is obtained which is easy to detach from the glass support. The foil obtained in this manner is completely colourless and absorbs ultraviolet light up to a wavelength of 350 mμ almost completely, while a foil not containing the absorber of the Formula 79 passes at least 80% of the ultraviolet light. Incidentally, the compounds mentioned in connection with polystyrene are also suitable for incorporation with polyacrylonitrile.

We claim:

1. Process for protecting an organic material selected from the group consisting of acetylcelluose, polyvinylchloride, synthetic polyamides and copolymers of unsatured polyesters from the action of ultraviolet rays, wherein an asymmetrical compound is applied to the organic material, said compound being free from hydroxyl groups in the ortho-positions to the amide nitrogen atom and corresponds to the formula

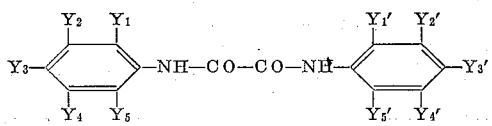

wherein $Y_1$, $Y_5$, $Y_1'$ and $Y_5'$ each represents a member selected from the group consisting of hydrogen, halogen, a substituent containing up to 20 carbon atoms selected from the group consisting of alkyl, substituted alkyl, —CO—NH—$E_1$, wherein $E_1$ is hydrogen or alkyl, —COO$E_2$, where $E_2$ is hydrogen or alkyl, and $Y_2$, $Y_3$, $Y_4$, $Y_2'$, $Y_3'$ and $Y_4'$ each represents the same group as $Y_1$, $Y_5$, $Y_1'$ and $Y_5'$ and where (a) each benzene nucleus contains at most two residues selected from the group consisting of —CO—NH—$E_1$ and —COO$E_2$, and (b) each benzene nucleus contains at most three of the other substituents different from hydrogen, and the substituents in the two benzene nuclei differ from each other in at least one point insofar as kind, number or positions are concerned.

2. Process according to claim 1, wherein there are applied asymmetrical compounds, free from hydroxyl groups in the ortho-positions, of the formula

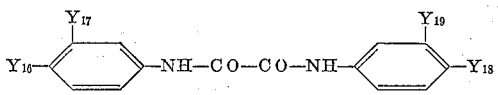

in which $Y_{16}$ represents a member selected from the group consisting of hydrogen, halogen and an alkyl group with 1 to 4 carbon atoms, $Y_{17}$ a hydrogen atom or an alkyl group with 1 to 4 carbon atoms, $Y_{18}$ a member selected from the group consisting of hydrogen, halogen, an alkyl group with up to 18 carbon atoms which may be substituted by hydroxyl groups or halogen atoms, a carboxylic acid group, a carboxylic acid amide or carboxylic acid ester, and $Y_{19}$ represents a hydrogen or halogen atom, with the proviso that at least one Y-substituent is different from hydrogen.

3. Process according to claim 1, wherein there are applied asymmetrical compounds of the formula

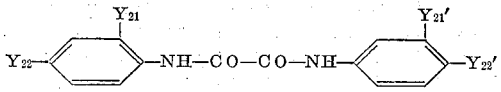

in which $Y_{21}$ and $Y_{22}$ and $Y_{21}'$ and $Y_{22}'$, respectively, represent a member selected from the group consisting of chlorine, bromine and an alkyl group with 1 to 4 carbon atoms, and one of the two substituents $Y_{21}$, $Y_{22}$ and $Y_{21}'$, $Y_{22}'$ represents a member selected from the group consisting of hydrogen, a carboxylic acid group and a carboxylic acid alkyl ester group with 1 to 8 carbon atoms in the alkyl grouping.

4. Process according to claim 1, wherein there are applied compounds of the general formula

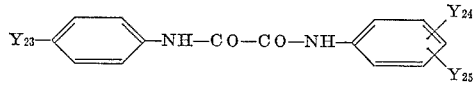

in which $Y_{23}$ represents a member selected from the group consisting of hydrogen, an alkyl group with 1 to 4 carbon atoms, fluorine, chlorine and bromine, and $Y_{24}$ and $Y_{25}$ each stands for a member selected from the group consisting of an alkyl group with 1 to 4 carbon atoms, a fluor-alkyl group, fluorine, chlorine and bromine.

References Cited

UNITED STATES PATENTS

| | | | |
|---|---|---|---|
| 3,211,562 | 10/1965 | Biland et al. | 260—45.9 |
| 3,239,484 | 3/1966 | Stark | 260—45.9 |
| 3,296,163 | 1/1967 | Manaresi et al. | 260—45.9 |

HOSEA E. TAYLOR, JR., Primary Examiner

U.S. Cl X.R.

106—186; 117—138.5, 138.8, 144; 252—300; 260—45.85, 45.9, 595